US 9,598,043 B2

(12) United States Patent
Kobayashi et al.

(10) Patent No.: US 9,598,043 B2
(45) Date of Patent: Mar. 21, 2017

(54) SIDE AIRBAG DEVICE FOR VEHICLES

(71) Applicant: Autoliv Development AB, Vårgårda (SE)

(72) Inventors: Yuto Kobayashi, Yokohama (JP); Yosuke Shimizu, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/908,038

(22) PCT Filed: Aug. 5, 2014

(86) PCT No.: PCT/JP2014/070615
§ 371 (c)(1),
(2) Date: Jan. 27, 2016

(87) PCT Pub. No.: WO2015/020052
PCT Pub. Date: Feb. 12, 2015

(65) Prior Publication Data
US 2016/0159310 A1    Jun. 9, 2016

(30) Foreign Application Priority Data

Aug. 6, 2013  (JP) ................................ 2013-163111
Aug. 7, 2013  (JP) ................................ 2013-163928

(51) Int. Cl.
*B60R 21/207*    (2006.01)
*B60R 21/232*    (2011.01)
(Continued)

(52) U.S. Cl.
CPC .......... *B60R 21/233* (2013.01); *B60R 21/207* (2013.01); *B60R 21/232* (2013.01);
(Continued)

(58) Field of Classification Search
CPC ............ B60R 21/207; B60R 21/23138; B60R 21/232; B60R 21/233; B60R 21/2389;
(Continued)

(56) References Cited

U.S. PATENT DOCUMENTS 5,853,191 A * 12/1998 Lachat .............. B60R 21/23138
280/729
6,142,507 A * 11/2000 Okuda .............. B60R 21/23138
280/730.2
(Continued)

FOREIGN PATENT DOCUMENTS

CA       2 826 660        3/2013
CN     102371961 A        3/2012
(Continued)

OTHER PUBLICATIONS

PCT International Search Report.

*Primary Examiner* — Laura Freedman
(74) *Attorney, Agent, or Firm* — Brinks Gilson & Lione

(57) ABSTRACT

A vehicular side airbag apparatus including chambers corresponding to an occupant's shoulder, lumbar, and chest and having three-dimensional shapes formed by baffles inside a side airbag and providing a thickness. The first baffle extends in a vehicular front-rear direction and is joined to a rear edge 103*a* of a side airbag 103 at a rear end 107*b* of the first baffle. The second baffle extends in a vehicular up-down direction and has an overlap portion 109 which is set at a longitudinally intermediate position of the second baffle and to which a longitudinally front end 107*c* of the first baffle is connected along with a vehicular interior panel 105 and a vehicular exterior panel 106. Longitudinal both ends 108*b* and 108*c* of the second baffle are joined to an outer peripheral edge of the side airbag 103.

22 Claims, 24 Drawing Sheets

(51) Int. Cl.
*B60R 21/233* (2006.01)
*B60R 21/239* (2006.01)
*B60R 21/237* (2006.01)
*B60R 21/26* (2011.01)
*B60R 21/231* (2011.01)
*B60R 21/00* (2006.01)

(52) U.S. Cl.
CPC .......... *B60R 21/237* (2013.01); *B60R 21/239* (2013.01); *B60R 21/23138* (2013.01); *B60R 21/26* (2013.01); *B60R 2021/0032* (2013.01); *B60R 2021/0044* (2013.01); *B60R 2021/0058* (2013.01); *B60R 2021/23146* (2013.01); *B60R 2021/23324* (2013.01)

(58) Field of Classification Search
CPC .... B60R 2021/0044; B60R 2021/0058; B60R 2021/23146; B60R 2021/23324
See application file for complete search history.

(56) References Cited

U.S. PATENT DOCUMENTS

| | | | |
|---|---|---|---|
| 6,402,190 B1 | 6/2002 | Heudorfer et al. | |
| 8,783,712 B2 * | 7/2014 | Fukushima | B60R 21/23138 280/730.2 |
| 9,039,037 B2 * | 5/2015 | Fukushima | B60R 21/233 280/730.2 |
| 9,145,102 B2 * | 9/2015 | Fujiwara | B60R 21/23138 |
| 9,296,356 B2 * | 3/2016 | Fujiwara | B60R 21/233 |
| 2009/0322062 A1 | 12/2009 | Bauer et al. | |
| 2012/0025499 A1 | 2/2012 | Shibayama et al. | |
| 2012/0248746 A1 | 10/2012 | Yamamoto | |
| 2014/0042735 A1 | 2/2014 | Shibayama et al. | |
| 2015/0336533 A1 * | 11/2015 | Haenel | B60R 21/2346 280/730.2 |
| 2015/0367811 A1 * | 12/2015 | Kobayashi | B60R 21/2346 280/730.2 |
| 2016/0200280 A1 * | 7/2016 | Fujiwara | B60N 2/42 280/729 |

FOREIGN PATENT DOCUMENTS

| | | | | |
|---|---|---|---|---|
| CN | 102695634 A | | 9/2012 | |
| CN | 103402824 A | | 11/2013 | |
| CN | 103747986 A | | 4/2014 | |
| DE | 102009005835 A1 | * | 10/2009 | .......... B60R 21/233 |
| EP | 2 412 585 A1 | | 2/2012 | |
| EP | 2 517 933 A1 | | 10/2012 | |
| JP | 2000108835 A | | 4/2000 | |
| JP | 2001063502 A | | 3/2001 | |
| JP | 2008001270 A | * | 1/2008 | |
| JP | 2009537360 A | | 10/2009 | |
| JP | WO 2011/077510 A1 | | 6/2011 | |
| JP | 2011-162012 | | 8/2011 | |
| JP | 2011-189791 | | 9/2011 | |
| JP | 2012-030614 | | 2/2012 | |
| JP | WO 2013/030995 A1 | | 3/2013 | |
| JP | WO 2013/031009 A1 | | 3/2013 | |
| JP | 2013063683 A | * | 4/2013 | |

\* cited by examiner

LAMINATING DIRECTION

SIDE AIRBAG DEVICE FOR VEHICLES

CROSS REFERENCE TO RELATED APPLICATIONS

This application claims priority to Japanese Application Nos. 2013-163111, filed on Aug. 6, 2013; 2013-163928, filed on Aug. 7, 2013; and PCT/JP2014/070615, filed on Aug. 5, 2014.

FIELD OF THE INVENTION

The present invention relates to a vehicular side airbag apparatus including chambers (bag areas partitioned by partitions) corresponding to an occupant's shoulder, lumbar, and chest regions and having three-dimensional shapes formed by installing baffles (partitions) formed from, for example, band-like members inside a side airbag and reasonably arranging the baffles to provide a thickness in a vehicular width direction. The vehicular side airbag apparatus allowing the side airbag to be configured at a high productivity using a small number of components.

DESCRIPTION OF THE RELATED ART

WO 2013/030995 and WO 2013/031009 describe known vehicular side airbag apparatuses. A "vehicular side airbag apparatus" in WO 2013/030995 is intended to provide a vehicular side airbag apparatus that enables both improvement of initial restraint performance of the side airbag and a reduction in a load on an occupant's chest using a simple configuration. In this side airbag apparatus, a sewn portion between a main panel and each side panel is discontinued in a certain area to form a vent hole portion. Flaps provided on the main panel and the side panels are inserted into a chest chamber through the vent hole portions. The flaps keep closing the vent hole portions under the internal pressure of the chest chamber at least until a side airbag is inflated and deployed to between the occupant and a door trim. On the other hand, when the chest chamber is compressed between the occupant and the door trim to elevate the internal pressure of the chest chamber, the flaps are pushed out of the air bag main body portion such that the vent hole portions are opened.

A "vehicular side airbag apparatus" in WO 2013/031009 is intended to provide a vehicular side airbag apparatus that enables a reduction in the number of panels forming a side airbag. In the side airbag in the vehicular side airbag apparatus, one panel is folded in two, and the resultant two portions are sewn together along an outer peripheral edge of the panel to form a bag-like airbag main body portion. Furthermore, the panel is partially folded back on itself, and the resultant portions are sewn together to form a tether portion that partitions the interior of the airbag main body portion into a chest chamber and a lumbar chamber.

A vehicular side airbag apparatus preferably includes a side airbag with a three-dimensional shape that provides a thickness in a vehicular width direction. The vehicular side airbag apparatus preferably forms chambers that enable an occupant's shoulder, lumbar, and chest regions to be appropriately received to enhance occupant protection performance. A side airbag with the above-described functionality is desirably configured at a high productivity using a small number of components.

The present invention has been developed in view of the above-described conventional problems. An object of the present invention is to provide a vehicular side airbag apparatus including chambers corresponding to an occupant's shoulder, lumbar, and chest regions and having three-dimensional shapes formed by installing baffles inside a side airbag and reasonably arranging the baffles to provide a thickness in a vehicular width direction, the vehicular side airbag apparatus allowing the side airbag to be configured at a high productivity using a small number of components.

SUMMARY OF THE INVENTION

An aspect of the present invention provides a vehicular side airbag apparatus having a side airbag that is built into a seatback and that is deployed and inflated from a vehicular rear toward a vehicular front through a gap between an occupant and a vehicular side portion when an inflator gas is fed into the side airbag. The side airbag is formed by joining, along an outer peripheral seam line, outer peripheral edges of a vehicular interior panel and a vehicular exterior panel that face each other. Three chambers including a lumbar restraining chamber, a shoulder restraining chamber, and a chest restraining chamber are formed inside the side airbag. An inflator that injects the inflator gas is provided in a vehicular rear portion inside the side airbag. A main portion of the side airbag is formed of at least one of the shoulder and lumbar restraining chambers. The side airbag is attached to the seatback such that a vehicular rear portion of the main portion is inflated inside the seatback. The three chambers are separated from one another by a first baffle and a second baffle. The first baffle is shaped like a band having a width in a vehicular width direction, extends in a vehicular front-rear direction inside the side airbag, and is joined, at a longitudinally rear end of the first baffle, to a rear edge of the side airbag. The second baffle is shaped like a band having a width in the vehicular width direction, extends in a vehicular up-down direction inside the side airbag, and has a baffle overlap area which is set at an intermediate position of the second baffle and to which a longitudinally front end of the first baffle is connected along with the vehicular interior panel and the vehicular exterior panel. Both ends of the second baffle are joined to an outer peripheral edge of the side airbag.

In the baffle overlap area, an angle formed by the second baffle and the first baffle on a side facing the inflator is preferably set to an acute angle. A gap is formed between the longitudinally front end of the first baffle and the second baffle so as to form an internal vent hole.

Desirably, the first baffle is formed using one panel material, is joined, at both side edges of the first baffle, to the vehicular interior panel and the vehicular exterior panel, respectively, and is simultaneously joined, at the longitudinally rear end of the first baffle, to the outer peripheral seam line.

Preferably, the second baffle is formed using one panel material, is joined, at both side edges of the second baffle, to the vehicular interior panel and the vehicular exterior panel, respectively, and is simultaneously joined to the outer peripheral seam line at a longitudinally upper end of the second baffle that extends at least from the baffle overlap area toward an upper side of the side airbag. Alternatively, desirably, the second baffle is formed using one panel material, is joined, at the both side edges of the second baffle, to the vehicular interior panel and the vehicular exterior panel, respectively, and is simultaneously joined to the outer peripheral seam line at a longitudinally lower end of the second baffle that extends at least from the baffle overlap area toward a lower side of the side airbag.

The first baffle preferably includes at least two panel pieces with substantially the same length and substantially the same width. The first baffle is preferably formed by joining together first side edges of the panel pieces in the longitudinal direction between the vehicular interior panel and the vehicular exterior panel. Second side edges of the panel pieces of the first baffle are preferably joined to the vehicular interior panel and the vehicular exterior panel, respectively. The longitudinally rear end of the first baffle is preferably simultaneously joined to the outer peripheral seam line.

The second baffle desirably includes at least two panel pieces with substantially the same length and substantially the same width. The second baffle is desirably formed by joining together first side edges of the panel pieces in the longitudinal direction between the vehicular interior panel and the vehicular exterior panel. Second side edges of the panel pieces of the second baffle are desirably joined to the vehicular interior panel and the vehicular exterior panel, respectively. The longitudinally upper end of the second baffle that extends at least from the baffle overlap area toward the upper side of the side airbag is desirably simultaneously joined to the outer peripheral seam line. Alternatively, the second baffle desirably includes at least two panel pieces with substantially the same length and substantially the same width. The second baffle is desirably formed by joining together first side edges of the panel pieces in the longitudinal direction between the vehicular interior panel and the vehicular exterior panel. Second side edges of the panel pieces of the second baffle are desirably joined to the vehicular interior panel and the vehicular exterior panel, respectively. The longitudinally lower end of the second baffle that extends at least from the baffle overlap area toward the lower side of the side airbag is desirably simultaneously joined to the outer peripheral seam line.

A flexible sleeve having openings at both ends thereof is desirably provided inside the side airbag so as to surround the inflator and to penetrate the first baffle. The flexible sleeve is desirably deformed by the inflator gas flowing into one of the shoulder and lumbar restraining chambers partitioned from each other by the first baffle to inhibit the inflator gas from flowing out toward the other of the shoulder and lumbar restraining chambers.

The inflator is preferably shaped like a cylinder, and has a plurality of gas injection holes arranged in a circumferential direction near one of longitudinal both ends of the inflator and has a connector for supply of an ignition signal provided at the other longitudinal end of the inflator. An opening through which an interior and an exterior of the side airbag are connected together is preferably formed in the vehicular rear portion of the side airbag such that the connector is exposed to the outside of the side airbag and the gas injection holes are arranged inside the side airbag. The inflator is preferably installed so as to penetrate the opening.

The vehicular side airbag apparatus of the present invention has a side airbag that includes a vehicular interior panel member and a vehicular exterior panel member and that is deployed and inflated from a vehicular rear toward a vehicular front between an occupant and a vehicular side portion when an inflator gas is fed into the side airbag. The vehicular side airbag apparatus includes a front up-down partitioning portion formed inside the side airbag so as to extend in a vehicular front-rear direction from a front end toward a rear end of the side airbag to a point at a distance from the rear end of the side airbag, a rear up-down partitioning portion formed inside the side airbag so as to extend in the vehicular front-rear direction from the rear end toward the front end of the side airbag to a point at a distance from the front end of the side airbag, the rear up-down partitioning portion including an overlap portion partially facing the front up-down partitioning portion in the up-down direction, an upper bag area defined in an internal upper portion of the side airbag by the front and rear up-down partitioning portions, a lower bag area defined in an internal lower portion of the side airbag by the front and rear up-down partitioning portions, and an inflator arranged on a rear side of the side airbag in the vehicular front-rear direction to feed the inflator gas into the upper bag area. Between the overlap portion and the front up-down partitioning portion, a gas passage is formed through which the inflator gas flows from the upper bag area into the lower bag area and which is closed off by at least one of the overlap portion and the front up-down partitioning portion that are flexibly deformed by the inflator gas fed into the lower bag area.

The front up-down partitioning portion preferably includes an upper extension portion extending continuously from a rear end of the front up-down partitioning portion in the vehicular front-rear direction toward an upper side in the vehicular up-down direction and reaching an upper end of the side airbag. The upper bag area is preferably partitioned into a front upper bag area and a rear upper bag area by the upper extension portion. A gas introduction path for feeding the inflator gas from the rear upper bag area to the front upper bag area is preferably formed in the upper extension portion.

The front up-down partitioning portion is desirably formed using a first band-like member. Widthwise, both ends of the first band-like member are desirably integrally joined to the vehicular interior panel member and the vehicular exterior panel member, respectively. A front end of the first band-like member is desirably integrally joined to the vehicular interior panel member and the vehicular exterior panel member.

The rear up-down partitioning portion is desirably formed using a second band-like member. Widthwise both ends of the second band-like member are desirably integrally joined to the vehicular interior panel member and the vehicular exterior panel member, respectively. A rear end of the second band-like member is desirably integrally joined to the vehicular interior panel member and the vehicular exterior panel member.

The vehicular interior panel member and the vehicular exterior panel member each desirably include an upper panel portion and a lower panel portion. The upper panel portion and the lower panel portion are desirably joined together by laying a lower portion of the upper panel portion on top of an upper portion of the lower panel portion.

Both side edges of the first band-like member are joined to the lower panel portions included in the vehicular interior panel member and the vehicular exterior panel member such that the first band-like member bridges upper portions of the lower panel portions. Both side edges of the second band-like member are desirably joined to the upper panel portions integrally with the lower panel portions and the first band-like member such that the second band-like member is sandwiched between the upper portions of the lower panel portions.

A mountain fold portion is desirably formed in the upper portion of the lower panel portion such that the lower panel portion curves upward. The first band-like member is desirably laid on top of the lower panel portion so as to stride over the mountain fold portion. The both side edges of the second band-like member are desirably joined to the upper panel portions integrally with the lower panel portion and the first band-like member such that the second band-like member is held by the mountain fold portion of the lower panel portion in a sandwiched manner.

The first band-like member preferably has a mountain fold portion formed by folding the first band-like member downward. The both side edges of the second band-like member are preferably joined to the vehicular interior panel member and the vehicular exterior panel member integrally with the first band-like member such that the second band-like member is held by the mountain fold portion of the first band-like member in a sandwiched manner.

The vehicular side airbag apparatus according to the present invention allows configuration of a side airbag including chambers corresponding to an occupant's shoulder, lumbar, and chest regions and having three-dimensional shapes formed by installing baffles inside the side airbag and reasonably arranging the baffles to provide a thickness in the vehicular width direction, the vehicular side airbag apparatus allowing the side airbag to be configured at a high productivity using a small number of components.

DESCRIPTION OF THE PREFERRED EMBODIMENTS

Figure 1:
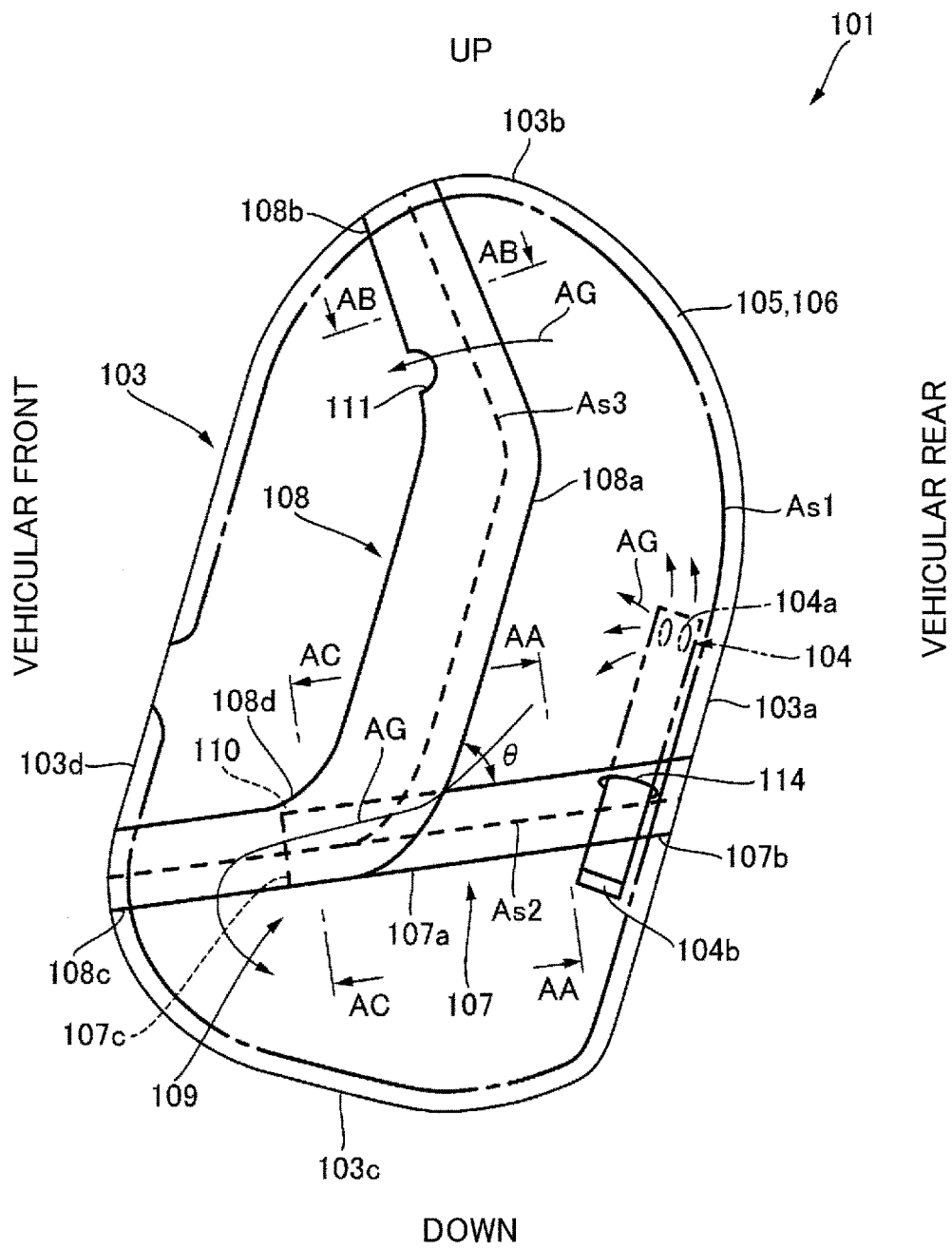
FIG. 1 is a side view depicting a general configuration of a first embodiment of a vehicular side airbag apparatus according to the present invention and in which a first baffle and a second baffle are drawn by solid lines.
Figure 2:
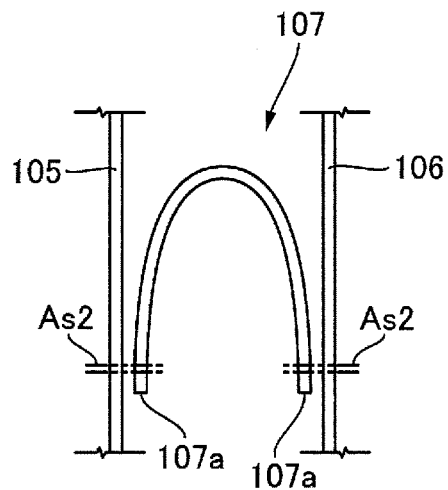
FIG. 2 is a sectional view taken along line AA-AA in FIG. 1.
Figure 3:
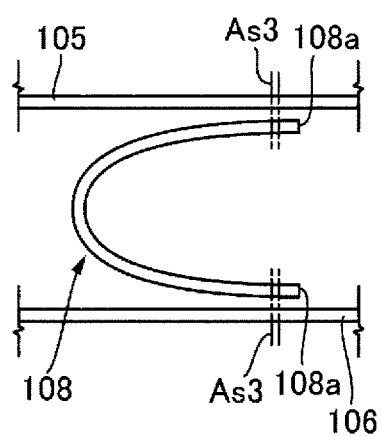
FIG. 3 is a sectional view taken along line AB-AB in FIG. 1.
Figure 4:
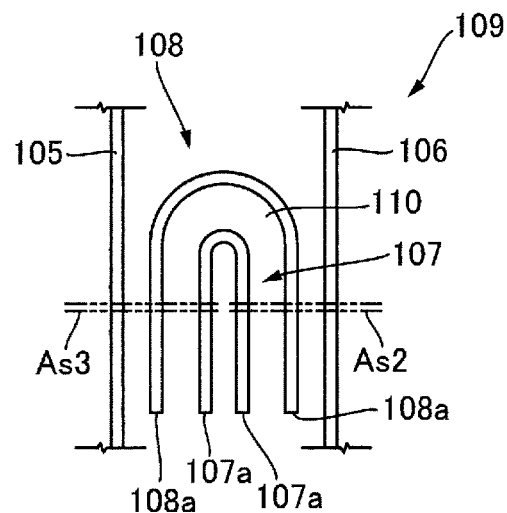
FIG. 4 is a sectional view taken along line AC-AC in FIG. 1.
Figure 5:
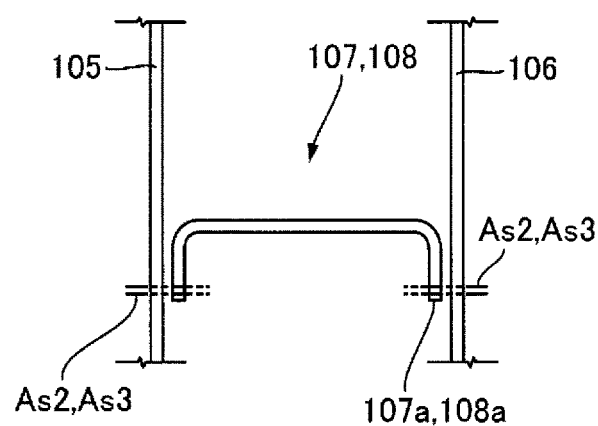
FIG. 5 is a sectional view corresponding to FIG. 2 or FIG. 3 and illustrating that a side airbag of the vehicular side airbag apparatus depicted in FIG. 1 has been inflated.
Figure 6:
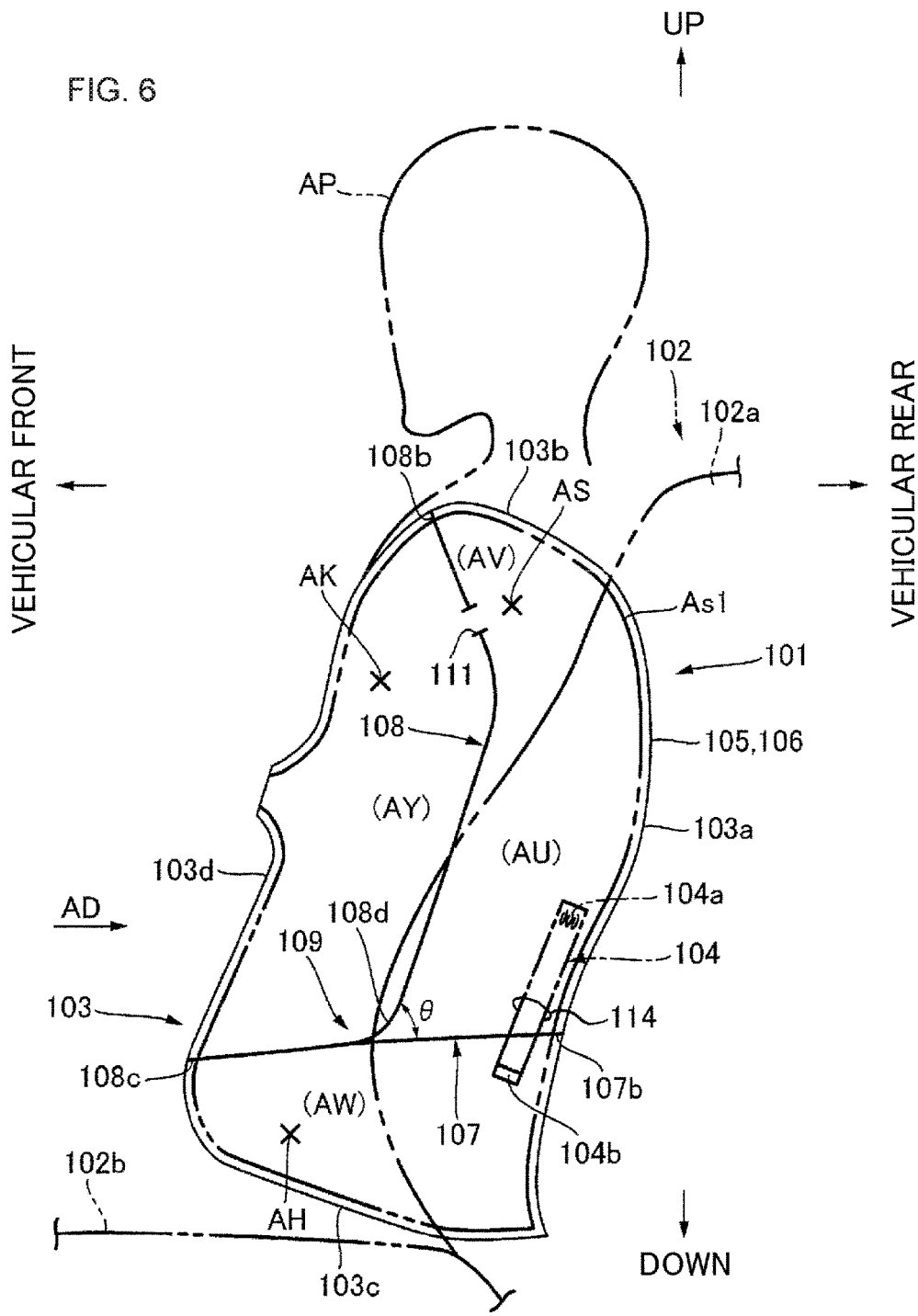
FIG. 6 is a schematic side view illustrating that the side airbag of the vehicular side airbag apparatus depicted in FIG. 1 has been deployed and inflated and in which the first and second baffles are represented by solid lines.
Figure 7:
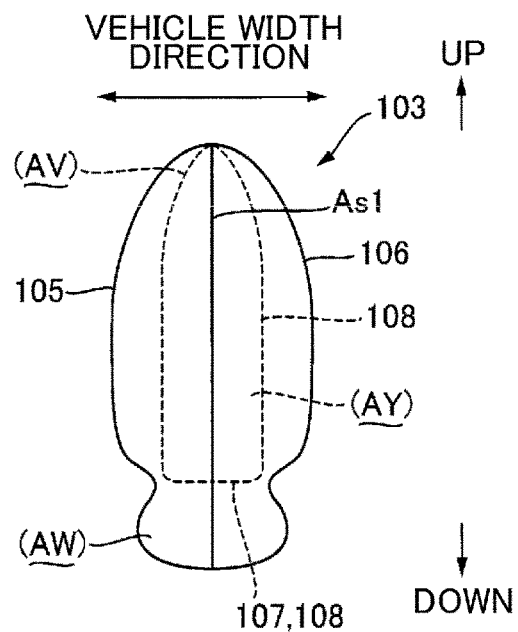
FIG. 7 is a sectional view taken along a direction AD indicated by an arrow in FIG. 6.

Preferred embodiments of a vehicular side airbag apparatus according to the present invention will be described below with reference to the attached drawings. FIG. 1 is a side view depicting a general configuration of a first embodiment of the vehicular side airbag apparatus according to the present invention and in which a first baffle and a second baffle are drawn by solid lines. FIG. 2 is a sectional view taken along line AA-AA in FIG. 1. FIG. 3 is a sectional view taken along line AB-AB in FIG. 1. FIG. 4 is a sectional view taken along line AC-AC in FIG. 1. FIG. 5 is a sectional view corresponding to FIG. 2 or FIG. 3 and illustrating that a side airbag of the vehicular side airbag apparatus depicted in FIG. 1 is inflated. FIG. 6 is a schematic side view illustrating that the side airbag of the vehicular side airbag apparatus depicted in FIG. 1 is deployed and inflated and in which the first and second baffles are represented with solid lines. FIG. 7 is a sectional view taken along a direction AD indicated by an arrow in FIG. 6. In the present embodiment, an up-down direction of the side airbag corresponds to an up-down direction of a vehicle. A front-rear direction of the side airbag corresponds to a vehicular front and a vehicular rear. A width direction of the side airbag corresponds to a vehicular width direction.

As depicted in FIG. 6, a vehicular side airbag apparatus 101 includes a side airbag 103 built into a seatback 102*a* of a seat 102 and that is deployed and inflated from the vehicular rear to the vehicular front through a gap between an occupant AP and a vehicular side portion when an inflator gas AG is fed into the side airbag 103.

As depicted in FIG. 1, the vehicular side airbag apparatus 101 mainly includes the side airbag 103 and an inflator 104 externally inserted into the side airbag 103 via an opening 114 described below and having gas injection holes 104*a* positioned inside the side airbag 103. The inflator 104 is fixed to the seatback 102*a*. As depicted in FIGS. 2 to 5, the side airbag 103 includes a vehicular interior panel 105 and a vehicular exterior panel 106. The panels 105 and 106 are formed of a flexible material that enables the housed side airbag to be deployed and inflated as conventionally known in the technical field of vehicular airbags.

The vehicular exterior panel 106 faces the vehicular side portion such as a door inner surface or a side window inner surface when the side airbag 103 is deployed. The vehicular interior panel 105 faces the occupant AP when the side airbag 103 is deployed.

The panels 105 and 106 are placed opposite to each other and integrally joined together at outer peripheral edges of the panels 105 and 106 along an outer peripheral seam line As1 formed by sewing, to form the side airbag 103 as a bag that is inflated by the inflator gas AG. Alternatively, a single panel member sized to correspond to the vehicular interior panel 105 and vehicular exterior panel 106 spliced together is folded back along the outer peripheral seam line As1 into a bag shape.

The side airbag 103 is folded into a housed state, and the folded side airbag 103 is housed inside the seatback 102*a*. When the side airbag 103 is deployed and inflated as depicted in FIG. 6, a rear edge 103*a* of the side airbag 103 located on a rear side in the vehicular front-rear direction is positioned in the seatback 102*a*, an upper edge 103*b* and a lower edge 103*c* located on an upper side and a lower side of the side airbag 103 in the vehicular up-down direction protrude upward and downward, respectively, while a front edge 103*d* of the side airbag 103 protrudes toward the vehicular front along a seat cushion 102*b*.

Inside the side airbag 103, three chambers including a lumbar restraining chamber AW, a shoulder restraining chamber AV, and a chest restraining chamber AY as depicted in FIG. 1 and FIG. 6. The chambers AV, AW, and AY are partitioned from one another by a first baffle 107 and a second baffle 108 described below and formed inside the side airbag 103.

The lumbar restraining chamber AW is positioned above the seat cushion 102*b* and formed in a lower portion of the side airbag 103 that faces the lumbar (depicted as AH in the figures) of the occupant AP. The shoulder restraining chamber AV is positioned in front of an upper portion of the seatback 102*a* and formed in an upper portion of the side airbag 103 that faces the shoulder of the occupant AP (depicted as AS in the figures). The chest restraining chamber AY is positioned in front of the seatback 102*a* and between the lumbar restraining chamber AW and the shoulder restraining chamber AV and formed in a vehicular front portion of the side airbag 103 that faces the chest of the occupant AP (depicted as AK in the figures).

When the side airbag 103 is inflated and deployed, first the shoulder restraining chamber AV is inflated and then the lumbar restraining chamber AW is deployed. Typically, the shoulder AS and the lumbar AH are preferentially restrained. Therefore, the main part of the side airbag 103 is formed of at least one of the shoulder and lumbar restraining chambers AV and AW. Of course, the main part includes both the shoulder and lumbar restraining chambers AV and AW.

A vehicular rear portion AU in the main part of the side airbag 103 positioned behind the chest restraining chamber AY in the vehicle is deployed and inflated inside the seatback 102*a* when the side airbag 103 is deployed and inflated (see FIG. 6). That is, an attachment position of the side airbag 103 with respect to the seatback 102*a* is set such that the vehicular rear portion AU in the main part is deployed and inflated inside the seatback 102*a*.

In the present embodiment, the shoulder restraining chamber AV forms the main part. Of course, the lumbar restraining chamber AW or both chambers AV and AW may form the main part. In the vehicular rear portion AU in the main part of the side airbag 103, the inflator 104 is provided which has the gas injection holes 104*a* positioned inside the side airbag 103 to allow the inflator gas AG to be injected into the vehicular rear portion AU.

The first baffle 107 is shaped like a band having a width in the vehicular width direction as depicted in FIG. 2 and other figures. In the present embodiment, the first baffle 107 is formed of one panel material. The first baffle 107 is formed of a flexible material such that, like the panels 105 and 106, the first baffle 107 in a folded state can be extended.

The first baffle 107 is arranged to separate the shoulder restraining chamber AV, including the main part, from the lumbar restraining chamber AW, is positioned on the lower side of the side airbag 103, and extends in the vehicular front-rear direction inside the side airbag 103. The first baffle 107 is joined, at widthwise both side edges 107*a* thereof, to the vehicular interior panel 105 and the vehicular exterior panel 106 along a junction line As2 formed by sewing. As depicted in FIG. 5, the first baffle 107 allows the side airbag 103 to be inflated into a three-dimensional shape in which the panels 105 and 106 are separated from each other in the vehicular width direction to provide a thickness in the vehicular width direction.

In a longitudinal direction of the first baffle 107, a longitudinally rear end 107*b* of the first baffle 107 is joined to the rear edges 103*a* of the side airbag 103. Specifically, the longitudinally rear end 107*b* of the first baffle 107 is simultaneously joined to the outer peripheral seam line As1 by sewing. The attachment position of the first baffle 107 is set such that the lumbar restraining chamber AW is located below the first baffle 107.

The second baffle 108 is shaped like a band having a width in the vehicular width direction as depicted in FIG. 1 and FIG. 3. In the present embodiment, the second baffle 108 is formed of one panel material. The second baffle 108 is also formed of a flexible material such that, like the panels 105 and 106 and the first baffle 107, the second baffle 108 in a folded state can be extended. The second baffle 108 extends generally in the vehicular up-down direction inside the side airbag 103.

More specifically, the second baffle 108 is shaped generally like a shaft of an arrow such that a central portion of the second baffle 108 extends along the vehicular up-down direction, while a lower portion and an upper portion of the second baffle 108 is bent toward the vehicular front. The second baffle 108 is also joined, at widthwise both side edges 108a thereof, to the vehicular interior panel 105 and the vehicular exterior panel 106 along a junction line As3 formed by sewing. The second baffle 108 also allows the side airbag 103 to be inflated into a three-dimensional shape in which the panels 105 and 106 are separated from each other in the vehicular width direction (see FIG. 5) to provide a thickness in the vehicular width direction.

This allows the vehicular rear portion AU in the main part to be quickly deployed to rapidly push a vehicular front portion in the main part out from the seatback 102a, achieving appropriate deployment performance.

For the both ends of the second baffle 108, an upper end 108b of an upper portion extending from a baffle overlap area 109 described below to an upper side of the side airbag 103 is joined to the upper edge 103b of the side airbag 103, and a lower end 108c of a lower portion is joined to the front end 103d of the side airbag 103. Specifically, the both ends 108b and 108c of the second baffle 108 are simultaneously joined to the outer peripheral seam line As1 by sewing.

The attachment position of the second baffle 108 is set such that the vehicular rear portion AU in the main part inflated inside the seatback 102a is positioned behind the second baffle 108, whereas, on the opposite side, the chest restraining chamber AY is positioned in front of the second baffle 108 and such that the lumbar restraining chamber AW is positioned below the lower portion, whereas the shoulder restraining chamber AV is positioned above the upper portion. The baffle overlap area 109 is set at an intermediate position of the second baffle 108, specifically, at a bent portion 108d shifting from a central portion to the lower portion.

In the baffle overlap area 109, the second baffle 108 and a longitudinally front end 107c of the first baffle 107 are laid on top of each other as depicted in FIG. 1 and FIG. 4. The second baffle 108 is laid on top of the longitudinally front end 107c of the first baffle 107 so as to wrap the longitudinally front end 107c from above. In the baffle overlap area 109, a gap is set between the front end 107c of the first baffle 107 and the second baffle 108. The gap forms an internal vent hole 110 that allows the lumbar restraining chamber AW to communicate with the chest restraining chamber AY.

For the junction in the baffle overlap area 109, the front end 107c of the first baffle 107, along with the second baffle 108, is connected to the vehicular exterior panel 106 and the vehicular interior panel 105 together as depicted in FIG. 4. More specifically, a portion of one of the side edges 108a of the second baffle 108 located near the bent portion 108d of the second baffle 108 and a portion of one of the side edges 107a of the first baffle 107 located near the front end 107c of the first baffle 107, which overlap, are collectively joined to the vehicular exterior panel 106 along junction lines As2 and As3. A portion of the other side edge 108a of the second baffle 108 located near the bent portion 108d the second baffle 108 and a portion of the other side edge 107a of the first baffle 107 located near the front end 107c of the first baffle 107, which overlap, are collectively joined to the vehicular interior panel 105 along the junction lines As2 and As3.

Thus, in the baffle overlap area 109, the partitioning by the baffles 107 and 108 results in formation of the chest restraining chamber AY on the upper side and formation of the lumbar restraining chamber AW on the lower side.

A sewing procedure for the baffle overlap area 109 is as follows. Before the junction along the outer peripheral seam line As1, the first and second baffles 107 and 108 are collectively joined to one of the vehicular interior and exterior panels 105 and 106 along the junction lines As2 and As3 on one side. Subsequently, the first and second baffles 107 and 108 are collectively joined to the other of the vehicular interior and exterior panels 105 and 106 along the junction lines As2 and As3 on the opposite side. Alternatively, the first and second baffles 107 and 108 may be pre-joined together, the first baffle 107 may be subsequently joined to the panels 105 and 106 along the junction lines As2, the second baffle 108 may then be joined to the panels 105 and 106 along the junction line As3, and finally, the panels 105 and 106, including the end 107b of the baffle 107 and the both ends 108b and 108c of the baffle 108, may be joined together along the outer peripheral seam line As1.

In the baffle overlap area 109, an angle θ formed by the second baffle 108 and the first baffle 107 on the side facing the inflator 104 is set to an acute angle. That is, the angle θ is set such that the bent portion 108d of the second baffle 108 gradually approaches the first baffle 107 arranged to extend from the rear edge 103a of the side airbag 103 toward the vehicular front, to reduce the gap between the first baffle 107 and the second baffle 108.

Compared to a case where the first baffle 107 and the second baffle 108 are joined together at right angles, this configuration enhances the strength of junction between the baffles 107 and 108 in the baffle overlap area 109. Near the junction portion between the first baffle 107 and the second baffle 108, the inflator gas AG flows at high speed from the shoulder restraining chamber AV to the lumbar restraining chamber AW, resulting in the need for an appropriate strength. Setting the angle θ formed by the two baffles 107 and 108 to an acute angle enables a reduction in damage caused by the inflator gas AG flowing into the side airbag 103. When the angle θ formed by the second baffle 108 and the first baffle 107 on the side facing the inflator 104 is set to an obtuse angle, an area from the main part to the shoulder restraining chamber AV has a substantially large volume, precluding the volumes of the chambers AV, AW, and AY from being appropriately set.

The inflator 104 is shaped like a cylinder and is disposed so as to penetrate the opening 114 formed near and above the rear end 107b of the first baffle 107. A plurality of the gas injection holes 104a is arranged in a circumferential direction near an upper end of the inflator 104 that is one of the both ends thereof in the longitudinal direction. A connector 104b for supply of an ignition signal is provided at a lower end of the inflator 104 that is the other end thereof. The opening 114 through which the interior and exterior of the side airbag 103 are connected together is formed in the vehicular rear portion AU in the main part of the side airbag 103 such that the connector 104b is exposed to the outside of the side airbag 103 and the gas injection holes 104a are arranged inside the side airbag 103. The opening 114 is formed to penetrate the first baffle 107 and one of the vehicular interior and exterior panels 105 and 106 (in the illustrated example, the vehicular interior panel 105), which are laid on top of each other. The inflator 104 is installed so as to penetrate the opening 114.

The inflator 104 is installed by being partially inserted into the side airbag 103 through the opening 114 until the vicinity of a center of the inflator 104 reaches the opening 114. The gas injection holes 104a are formed at an upper end of the inflator 104 inserted into the side airbag 103. A stud bolt (not depicted in the drawings) is provided in the inflator 104 and used to fix the inflator 104 to the seatback 102a. The vicinity of the opening 114 has a double structure with the vehicular interior panel 105, located outside, and the first baffle 107, located inside, and has a rigidity set to be relatively high. This is intended to deal with the pressure of the inflator gas AG and heat from the inflator 104.

The opening 114 is formed to penetrate the vehicular interior panel 105. The inflator 104 is inserted into the opening 114 until the vicinity of the center of the inflator 104 reaches the opening 114. The inflator 104 is installed in such an orientation as sets the longitudinal direction of the inflator 104 along the outer peripheral seam line As1.

The inflator 104 injects the inflator gas AG through the gas injection holes 104a. First, the shoulder restraining chamber AV is filled with the inflator gas AG injected through the gas injection holes 104a. Subsequently, the inflator gas AG flows through the internal vent hole 110 into the lumbar restraining chamber AW. Slightly later than the shoulder restraining chamber AV, the lumbar restraining chamber AW is filled with the inflator gas AG.

Another internal vent hole 111 is formed in the second baffle 108 so as to communicate with the shoulder restraining chamber AV and the chest restraining chamber AY. The inflator gas AG with which the shoulder restraining chamber AV is filled flows into the chest restraining chamber AY via the internal vent hole 111, and the chest restraining chamber AY is filled with the inflator gas AG. The inflator gas AG with which the lumbar restraining chamber AW is filled closes the internal vent hole 110 including the gap between the first baffle 107 and the second baffle 108, and is thus prevented from flowing back from the lumbar restraining chamber AW. The mechanism of the reflux prevention in the internal vent hole 110 is an effect described below using FIG. 17 and FIG. 18.

Now, effects of the vehicular side airbag apparatus 101 according to the present embodiment will be described. During manufacture, as depicted in FIGS. 1 to 5, the first baffle 107 and the second baffle 108, each having a width in the vehicular width direction, are prepared, and in the baffle overlap area 109, the first baffle 107 is set in an inverse U or V shape as viewed in the up-down direction. The periphery of the bent portion 108d of the second baffle 108 set in a similar form is laid on top of the first baffle 107. One of the side edges 107a of the baffle 107 and one of the side edges 108a of the baffle 108 are joined to one of the exterior and vehicular interior panels 106 and 105 along the junction lines As2 and As3. Furthermore, the first baffle 107 is joined to the panel all along the length of the first baffle 107 in the longitudinal direction and along the junction line As2. Then, the second baffle 108 is joined to the panel all along the length of the second baffle 108 and along the junction line As3.

Thus, the first and second baffles 107 and 108 are attached to one of the exterior and vehicular interior panels 106 and 105.

The other side edge 107a of the baffle 107 and the other side edge 108a of the baffle 108 are joined to the other of the exterior and vehicular interior panels 106 and 105 along the junction lines As2 and As3. Furthermore, the first baffle 107 is joined all along the length of the first baffle 107 to the panel in the longitudinal direction and along the junction line As2. Then, the second baffle 108 is joined to the panel all along the length of the second baffle 108 and along the junction line As3. Thus, the first and second baffles 107 and 108 are attached to both the vehicular exterior panel 106 and the vehicular interior panel 105 so as to be sandwiched between the vehicular exterior panel 106 and the vehicular interior panel 105

In this case, the front end 107c of the first baffle 107 is joined to the second baffle 108 and to both panels 105 and 106. Subsequently, the panels 105 and 106, including the rear end 107b of the first baffle 107 and the both ends 108b and 108c of the second baffle 108, are joined together along the outer peripheral seam line As1. Thus, the side airbag 103 is produced.

In another manufacturing method, first, the both side edges 108a of the second baffle 108 are jointed to both the vehicular exterior panel 106 and the vehicular interior panel 105 all along the length of the second baffle 108 and along the junction line As3. Then, the first baffle 107 and the second baffle 108 are laid on top of each other with the front end 107c of the first baffle 107 held in the periphery of the bent portion 108d of the second baffle 108 in a sandwiched manner, to set the baffle overlap area 109.

With the baffle overlap area 109 set, the both side edges 107a of the first baffle 107 are joined to both the vehicular exterior panel 106 and the vehicular interior panel 105 all along the length of the side edges 107a and along the junction line As2. The junction allows the front end 107c of the first baffle 107 to be joined to the second baffle 108 and both panels 105 and 106.

In this case, the first baffle 107 and the second baffle 108 are installed so as to be bendable into a U or V shape between the vehicular exterior panel 106 and the vehicular interior panel 105 in response to contact of the panels 105 and 106 with each other and separation of the panels 105 and 106 from each other. Thus, the first and second baffles 107 and 108 are attached to both the vehicular exterior panel 106 and the vehicular interior panel 105 so as to be sandwiched between the vehicular exterior panel 106 and the vehicular interior panel 105.

Subsequently, the panels 105 and 106, including the rear end 107b of the first baffle 107 and the both ends 108b and 108c of the second baffle 108, are joined together along the outer peripheral seam line As1. Thus, the side airbag 103 is produced.

When the inflator 104 is activated to inject the inflator gas AG, the inflator gas AG flows through the shoulder restraining chamber AV and the lumbar restraining chamber AW to inflate the chambers AV and AW, starting deployment and inflation of the side airbag 103. The vehicular rear portion AU in the main part of the side airbag 103 is inflated in the seatback 102a, and at the same time, the shoulder restraining chamber AV as a whole is instantaneously filled with the inflator gas AG. The lumbar restraining chamber AW is also instantaneously filled with the inflator gas AG through the internal vent hole 110. Thus, the shoulder AS of the occupant AP and a peripheral portion thereof and the lumber AH of the occupant AP and a peripheral portion thereof are protected early and quickly.

The inflator gas AG with which the shoulder restraining chamber AV and the lumbar restraining chamber AW are filled subsequently flows into the chest restraining chamber AY via the internal vent hole 111. Inflation of the chest restraining chamber AY is completed with a slight delay. Thus, the chest AK of the occupant AP and a peripheral portion thereof are protected. As depicted in FIG. 6 and FIG. 7, the three chambers AV, AW, and AY are all inflated so as to have a thickness in the vehicular width direction established by the baffles 107 and 108 having a width. The chambers AV, AW, and AY can serve as the side airbag 103 with a three-dimensional shape to protect the occupant AP.

In the vehicular side airbag apparatus 101 according to the present embodiment, the first baffle 107 and the second baffle 108 are assembled inside the side airbag 103. Inside the side airbag 103, the first baffle 107 extends in the vehicular front-rear direction, with the longitudinally rear end 107b joined to the rear edge 103a of the side airbag 103. The second baffle 108 extends in the vehicular up-down direction, and in the baffle overlap area 109 set at the intermediate position of the second baffle 108, is connected to the vehicular interior panel 105 and the vehicular exterior panel 106 together along with the longitudinally front end 107c of the first baffle 107. The both ends 108b and 108c of the second baffle 108 are jointed to the outer peripheral edge of the side airbag 103. The reasonable arrangement of the first baffle 107 and the second baffle 108 provides the side airbag 103 with a three-dimensional shape with a thickness in the vehicular width direction, and allows the chambers AV, AW, and AY corresponding to the shoulder AS, the lumbar AH, and the chest AK of the occupant AP to be formed at once. The mere addition of the two baffles 107 and 108 allows the side airbag 103 with a high productivity to be configured using a small number of components.

The baffles 107 and 108 may be tapered so as to have a width gradually decreasing toward areas of the baffles 107 and 108 joined to the outer peripheral edge of the side airbag 103. This configuration enables enhancement of the capability of junction at the outer peripheral edge of the side airbag 103, allowing prevention of leakage of the inflator gas AG and unpredictable burst.

In the baffle overlap area 109, the angle θ formed by the second baffle 108 and the first baffle 107 on the side facing the inflator 104 is set to an acute angle such that the first baffle 107, arranged to extend from the rear edge 103a of the side airbag 103 toward the vehicular front, gradually approaches the bent portion 108d of the second baffle 108 to reduce the gap between the first baffle 107 and the second baffle 108. This enables an increase in the strength of the junction between the baffles 107 and 108 and between the panels 105 and 106 in the baffle overlap area 109. A check valve effect can also be enhanced.

Figure 8:
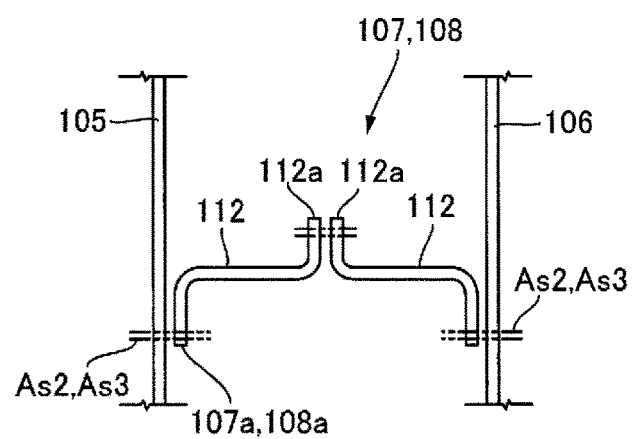
FIG. 8 is a sectional view corresponding to FIG. 2 and FIG. 3 and depicting a first variation of the first embodiment of the vehicular side airbag apparatus according to the present invention.

FIG. 8 depicts a first variation of the first embodiment. FIG. 8 is a sectional view corresponding to FIG. 2 and FIG. 3. In the above-described embodiment, each of the first and second baffles 107 and 108 is formed of one panel material. However, each of the first and second baffles 107 and 108 may be formed of a plurality of, at least two panel pieces 112.

That is, the baffles 107 and 108 are formed by arranging, in the width direction, a plurality of panel pieces 112 with substantially the same length and substantially the same width and joining the panel pieces together. The illustrated example represents a case where each of the baffles 107 and 108 is formed using two panel pieces 112. Side edges 112a of the panel pieces 112 are joined together in the longitudinal direction. Thus, baffles 107 and 108 each with a junction portion in a central portion thereof are formed which are similar to the baffles 107 and 108 in the above-described embodiment.

For the first baffle 107, the side edges 112a of the panel pieces 112 are joined together in the longitudinal direction between the vehicular interior panel 105 and the vehicular exterior panel 106. The side edge 107a of each of the panel pieces 112 of the first baffle 107 is joined to the vehicular interior panel 105 and the vehicular exterior panel 106, and the longitudinally rear end 107b of the first baffle 107 is simultaneously joined to the outer peripheral seam line As1.

For the second baffle 108, the side edges 112a of the panel pieces 112 are joined together in the longitudinal direction between the vehicular interior panel 105 and the vehicular exterior panel 106. The side edge 108a of each of the panel pieces 112 of the second baffle 108 is joined to the vehicular interior panel 105 and the vehicular exterior panel 106, and the longitudinally upper end 108b of the second baffle 108, extending at least from the baffle overlap area 109 toward an upper side of the side airbag 103, is simultaneously joined to the outer peripheral seam line As1.

Even the above-described first variation of course produces effects similar to the effects of the above-described embodiment. In the first variation, the panel pieces 112 may be pre-joined to the vehicular interior panel 105 and the vehicular exterior panel 106 and then joined together to form the baffles 107 and 108 before the panels 105 and 106 are joined together along the outer peripheral seam line As1. Consequently, the first variation enables the vehicular interior and exterior panels 105 and 106 with the panel pieces 112 joined thereto to be separately handled to allow the side airbag 103 to be more easily and efficiently assembled than the above-described embodiment in which each of the baffles 107 and 108 is formed of one panel material.

Figure 9:
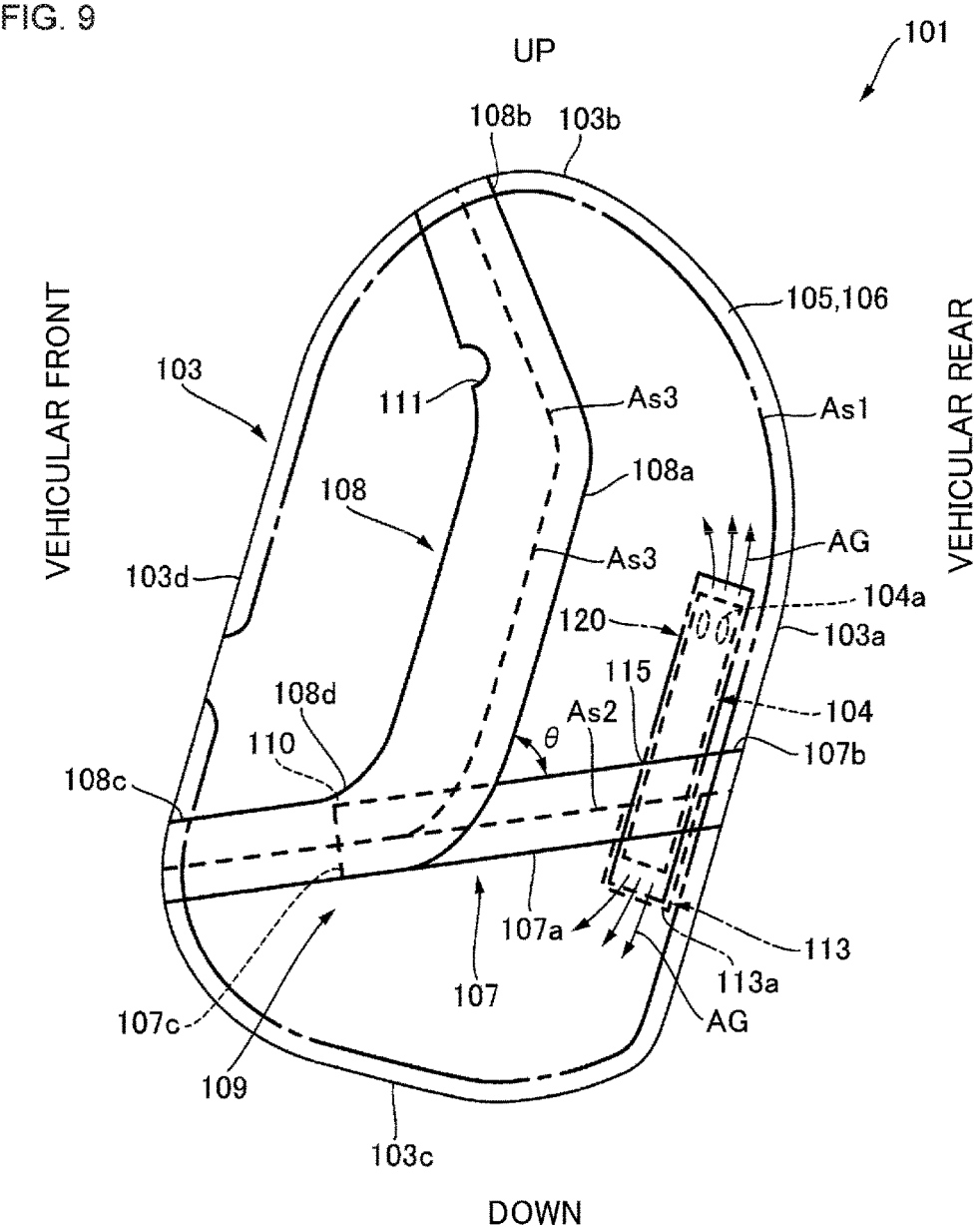
FIG. 9 is a sectional view corresponding to FIG. 1 and depicting a second variation of the first embodiment of the vehicular side airbag apparatus according to the present invention.

FIG. 9 depicts a second variation of the first embodiment. FIG. 9 is a side view corresponding to FIG. 1. In the second variation, the inflator 104 as whole is housed inside the side airbag 103. Therefore, the inflator 104 is prevented from being exposed to the outside. A through-hole 115 for the inflator 104 is formed at the longitudinally rear end 107b of the first baffle 107, which extends in the vehicular front-rear direction. The inflator 104 inserted through the through-hole 115 is positioned such that an upper portion of the inflator 104 lies in the shoulder restraining chamber AV, whereas a lower portion of the inflator 104 lies in the lumbar restraining chamber AW. A flexible sleeve 113 provided in the lumbar restraining chamber AW is joined to the periphery of the through-hole 115. A metallic diffuser 120 is provided around an outer periphery of the inflator 104. The diffuser 120 is shaped like a hollow tube and covers substantially the entire outer periphery of the inflator 104. The inflator gas AG is injected from both an upper end and a lower end of the diffuser 120. An opening 113a is formed at a lower end of the flexible sleeve 113. The flexible sleeve 113 penetrates the through-hole 115 in the first baffle 107 to surround the lower portion of the inflator 104, positioned in the lumbar restraining chamber AW.

The periphery of the opening 113a in the flexible sleeve 113 is deformed by the pressure of the inflator gas AG acting on peripheries. When the gas pressure in the chambers AV and AW overcomes the force of the gas injected from the inflator 104, the inflator gas AG enters the tube of the diffuser 120 to close the opening 113a. Thus, the check valve effect can be exerted which inhibits the inflator gas AG having flowed into one of the shoulder and lumbar restraining chamber AV and AW partitioned from each other by the first baffle 107 from flowing out to the other of the shoulder and lumbar restraining chamber AV and AW. Therefore, the internal pressures of the chambers AV and AW can be appropriately and easily controlled, allowing occupant protection performance to be enhanced.

Figure 10:
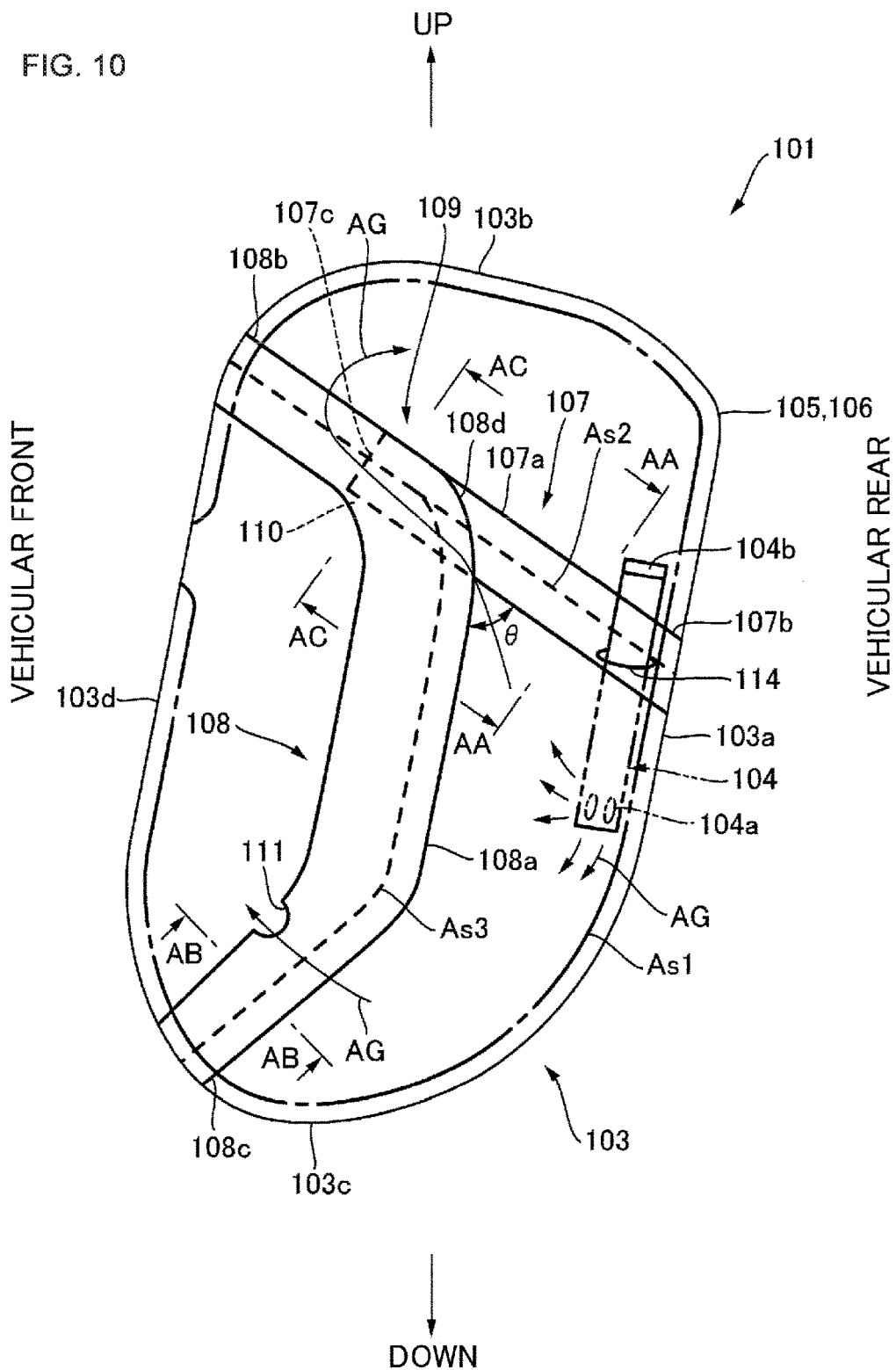
FIG. 10 is a sectional view corresponding to FIG. 1 and depicting a third variation of the first embodiment of the vehicular side airbag apparatus according to the present invention.

FIG. 10 depicts a third variation of the first embodiment. FIG. 10 is a side view corresponding to FIG. 1. A sectional view taken along line AA-AA in FIG. 10, a sectional view taken along line AB-AB in FIG. 10, and a sectional view taken along line AC-AC in FIG. 10 are similar to FIGS. 2 to 4, respectively. In the illustrated example, each of the first and second baffles 107 and 108 is formed of one panel material.

The third variation represents a case where the main part includes the lumbar restraining chamber AW. Therefore, unlike in the above-described embodiment, the first baffle 107 is positioned on the upper side of the side airbag 103 at a position where the lumbar restraining chamber AW is separated from the shoulder restraining chamber AV, and extends in the vehicular front-rear direction inside the side airbag 103. The position of the second baffle 108 in the up-down direction in the third variation is also substantially opposite to the position of the second baffle 108 in the up-down direction in the embodiment depicted in FIG. 1.

That is, for the second baffle 108, the lower end 108c of the lower portion extending from the baffle overlap area 109 to the lower portion of the side airbag 103 is joined to the lower edge 103c of the side airbag 103, and the upper end 108b of the upper portion is joined to the upper edge 103b of the side airbag 103. The production and the deployment and inflation effect of the side airbag 103 are substantially similar to the production and the deployment and inflation effect of the side airbag 103 in the above-described embodiment except that the inflator gas AG is fed from the lumbar restraining chamber AW to the shoulder restraining chamber AV and the chest restraining chamber AY through the internal vent holes 110 and 111. Even the third variation of course produces effects similar to those of the above-described embodiment.

The first and second variations are also applicable to the third embodiment. That is, each of the baffles 107 and 108 may be formed by joining a plurality of panel pieces 112 together. For example, for the second baffle 108, the side edges 112a of the panel pieces 112 are joined together in the longitudinal direction between the vehicular interior panel 105 and the vehicular exterior panel 106. The side edge 108a of each of the panel pieces 112 of the second baffle 108 is joined to the vehicular interior panel 105 and the vehicular exterior panel 106, and the lower end 108c of the second baffle 108, extending at least from the baffle overlap area 109 toward the lower side of the side airbag 103, is simultaneously joined to the outer peripheral seam line As1. This also applies to the first baffle 107. Thus, effects similar to the effects of the first variation can be exerted.

Now, a second to a fourth embodiments of the vehicular side airbag apparatus according to the present invention will be described with reference to the attached drawings. The embodiments relate to improvement of the vehicular side airbag apparatus according to the first embodiment.

The embodiments particularly relates to a vehicular side airbag apparatus in which a partition that partitions the interior of the side airbag into a plurality of chambers has a function to inhibit reflux of the inflator gas, allowing formation of a plurality of chambers and adjustment of the internal pressure of each chamber to be achieved at once using a small number of components.

The conventional vehicular side airbag apparatus has a side airbag that is built into the seat and that is deployed and inflated from the vehicular rear to the vehicular front between the occupant and the vehicular side portion when the inflator gas is fed from the inflator into the side airbag. The side airbag may include a tether or a separation wall in order to allow an inflation form to be adjusted or to allow the interior to be divided into a plurality of chambers. A vehicular side airbag apparatus of this type is known from, for example, Japanese Patent Application Laid-open No. 2000-108835.

An object of the "airbag apparatus" in Japanese Patent Application Laid-open No. 2000-108835 is to prevent a sewn portion between the airbag and a tether belt that controllably allows the airbag to be inflated and deployed into a predetermined shape from being damaged by a high-pressure gas and to reduce the size and weight of the airbag apparatus. An impact made at the time of a collision causes the inflator to inject the high-pressure gas to inflate and deploy the airbag in order to protect the occupant from the impact made at the time of the collision. The airbag is internally provided with at least one tether belt that controllably allows the airbag to be inflated and deployed into the predetermined shape. A fixed portion between a base cloth of the airbag and the tether belt is sewn using two rows of sewn portions including a first sewn portion and a second sewn portion provided in juxtaposition in a longitudinal direction of the tether belt. The second sewn portion positioned closer to a central portion of the tether belt than the first sewn portion located at an end of the tether belt is configured to be easily broken or unraveled under a tensile force applied to the ether belt when the airbag is inflated.

In general, inflator gas reflux prevention means is known to be provided in order to adjust the internal pressure inside the airbag. In an "airbag check valve and an airbag" in Japanese Patent Application Laid-open No. 2001-63502, a connection hose is provided between a first chamber and a second chamber as an airbag check valve for an automobile occupant restraint system. An inner cloth is arranged in the connection hose. The inner cloth allows the connection hose to be divided into a fluid passage between the first chamber and the second chamber and a pressure chamber connected to the second chamber. When the internal pressure of the second chamber is lower than the internal pressure of the first chamber, the inner cloth causes the fluid passage to be opened. When the internal pressure of the second chamber is higher than the internal pressure of the first chamber, the inner cloth causes the fluid passage to be closed off under the internal pressure acting on the pressure chamber.

An "automobile airbag" in Japanese Translation of PCT Application No. 2009-537360 relates to an automobile airbag having a channel via which two pressure chambers are connected together such that a flow medium, specifically a gas, flows forward through the channel from one of the pressure chambers to the other pressure chamber. For example, to enhance adaptability of the airbag to lateral impact loads, the channel includes reflux prevention means. The reflux prevention means enables the flow medium to flow forward, while preventing most of a flow of the flow medium in a blocking direction opposite to the forward direction.

As disclosed in Japanese Patent Application Laid-open No. 2000-108835, every effort has been made to divide the interior of the side airbag, which conventionally mainly includes panels, into a plurality of chambers (areas). When the side airbag can include a plurality of chambers, the internal pressures of the chambers can be made adjustable as needed such that, for example, the occupant's lumbar, shoulder, and chest can be appropriately received by the chambers, allowing occupant protection performance to be enhanced.

However, when a plurality of chambers is formed, adoption of a tether or a separation wall as an additional component leads to complicated junction portions between the separation wall or the like and panels, making production of the side airbag itself cumbersome. Furthermore, providing the junction portion with a high strength is difficult. Thus, implementing a side airbag with a plurality of chambers has been very difficult.

On the other hand, a valve structure or the like that inhibits reflux of an inflator gas is known to be provided when the internal pressures of a plurality of chambers are adjusted (see Japanese Patent Application Laid-open No. 2001-63502 and Japanese Translation of PCT Application No. 2009-537360). However, separately providing the valve structure in addition to the separation wall and the like leads to a further increase in the number of components of the side airbag apparatus. An increased number of components further complicate production of the side airbag, thus disadvantageously making provision of the strength of the junction portion more difficult.

Thus, improvements of the vehicular side airbag apparatus (second to fourth embodiments) provide a configuration in which a partition that partitions the interior of the side airbag into a plurality of chambers has a function to inhibit reflux of the inflator gas to enable formation of the plurality of chambers and adjustment of the internal pressure of each chamber to be achieved at once using a small number of components.

Figure 11:
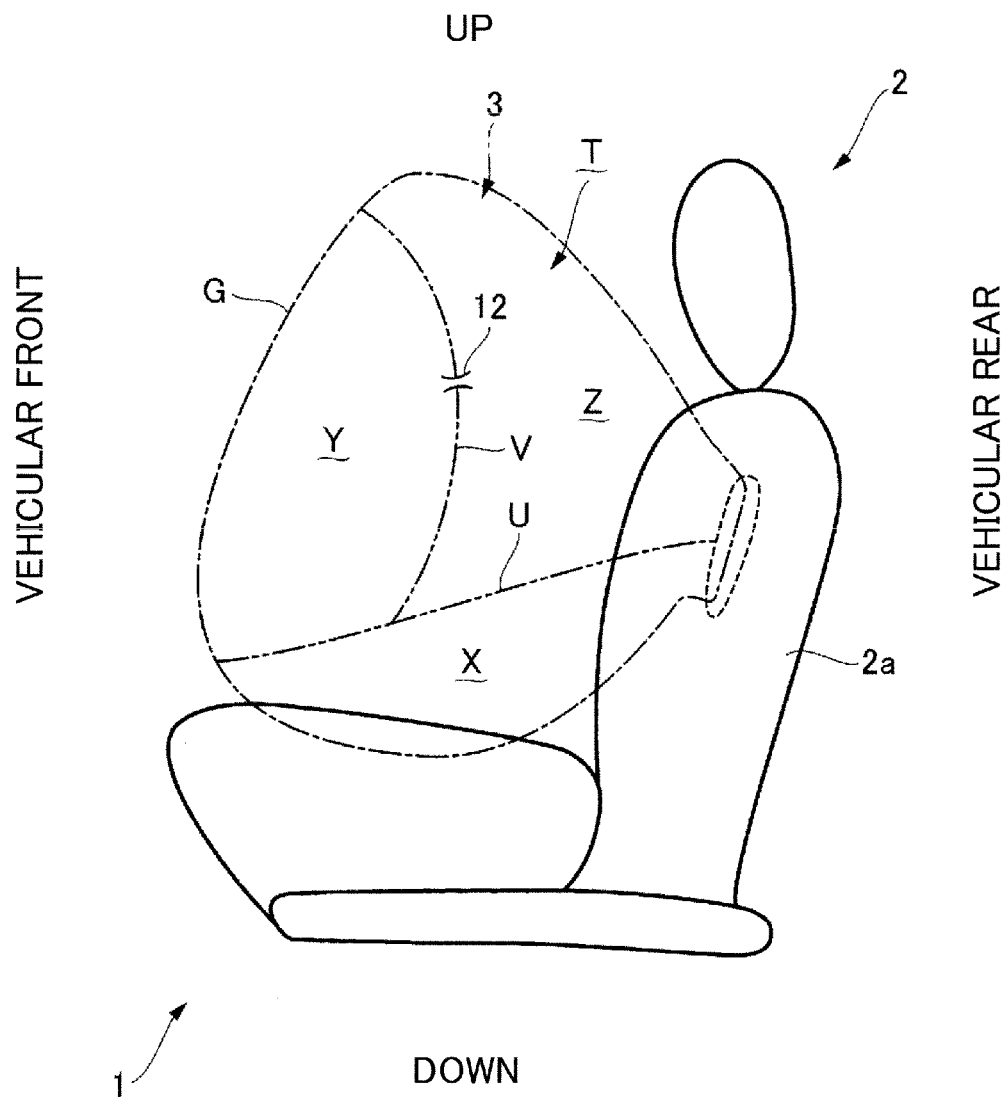
FIG. 11 is a side view schematically depicting the vehicular side airbag apparatus described throughout the specification.
Figure 12:
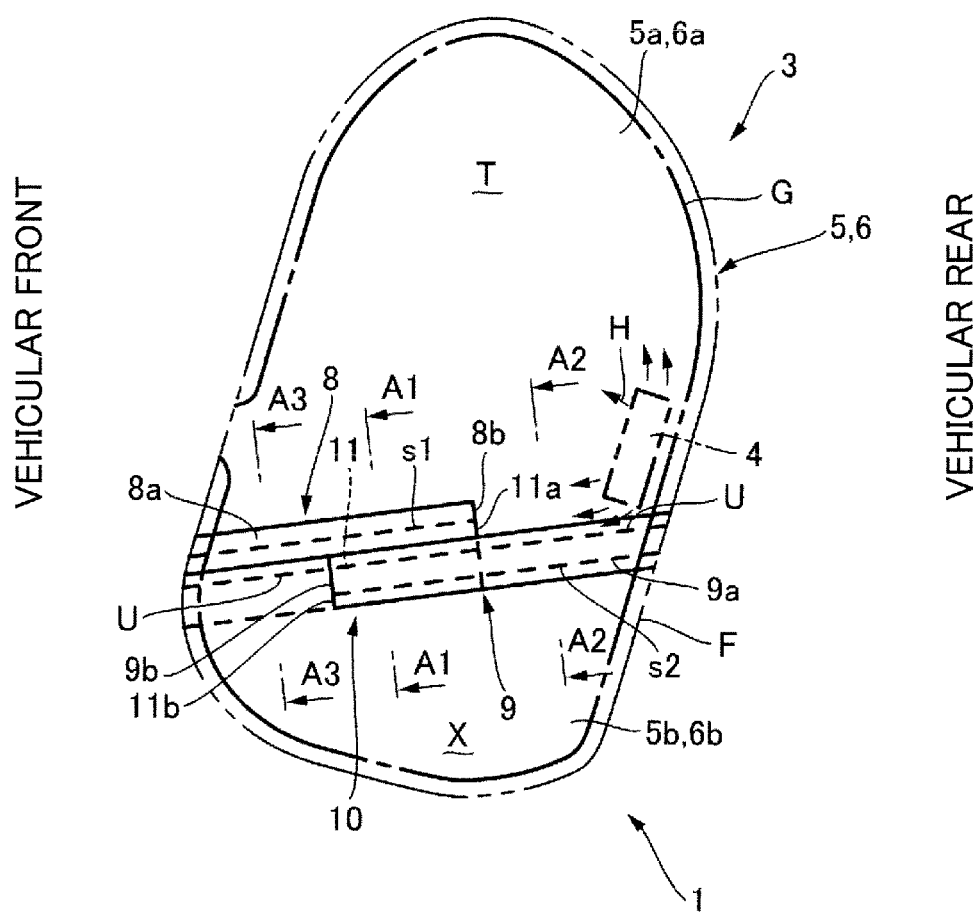
FIG. 12 is a side view depicting a second embodiment of the vehicular side airbag apparatus according to the present invention.
Figure 13:
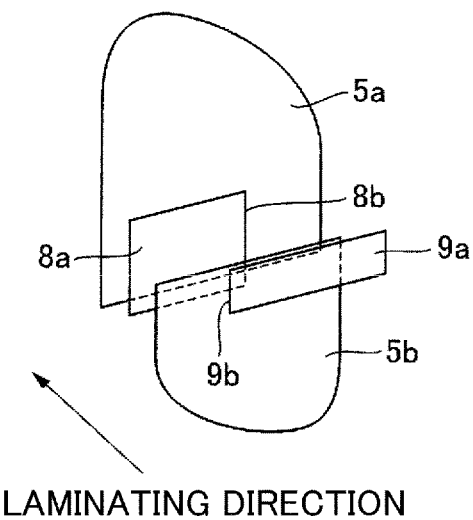
FIG. 13 is a diagram illustrating how components of the vehicular side airbag apparatus depicted in FIG. 11 are assembled.
Figure 14:
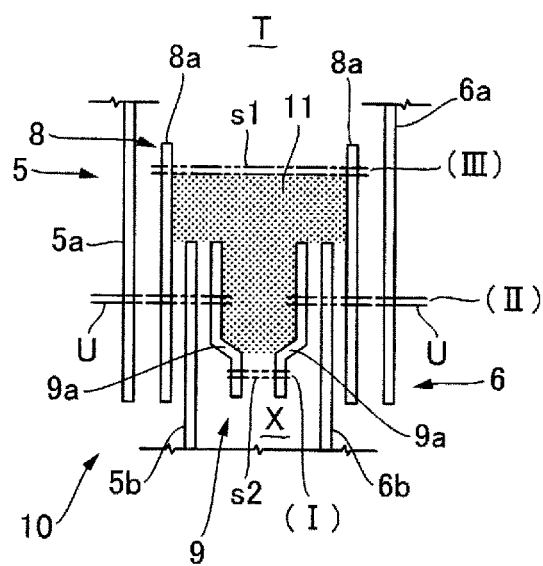
FIG. 14 is a sectional view taken along line A1-A1 in FIG. 12.
Figure 15:
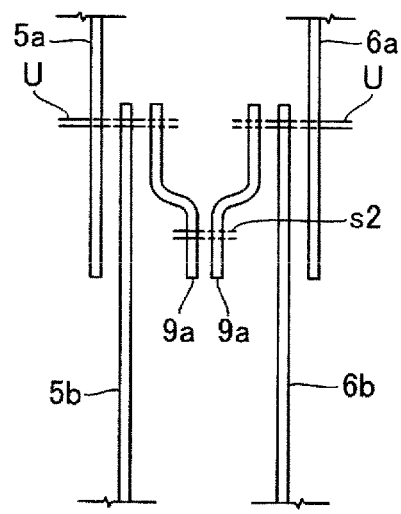
FIG. 15 is a sectional view taken along line A2-A2 in FIG. 12.
Figure 16:
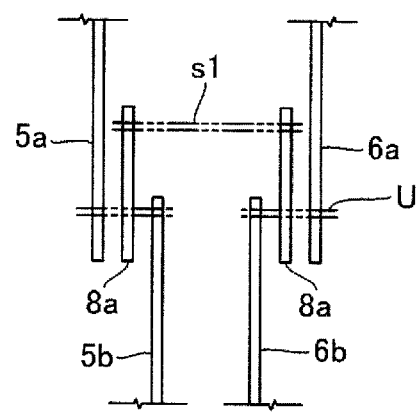
FIG. 16 is a sectional view taken along line A3-A3 in FIG. 12.
Figure 17:
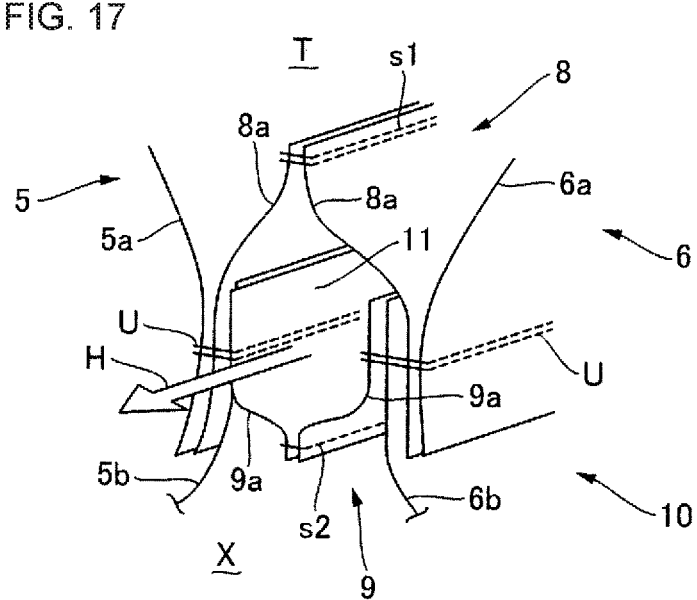
FIG. 17 is an enlarged perspective view of an important part of the vehicular side airbag apparatus depicted in FIG. 12 which part is located near the section taken along line A1-A1, the view illustrating how an inflator gas flows through a gas passage formed in the vehicular side airbag apparatus.
Figure 18:
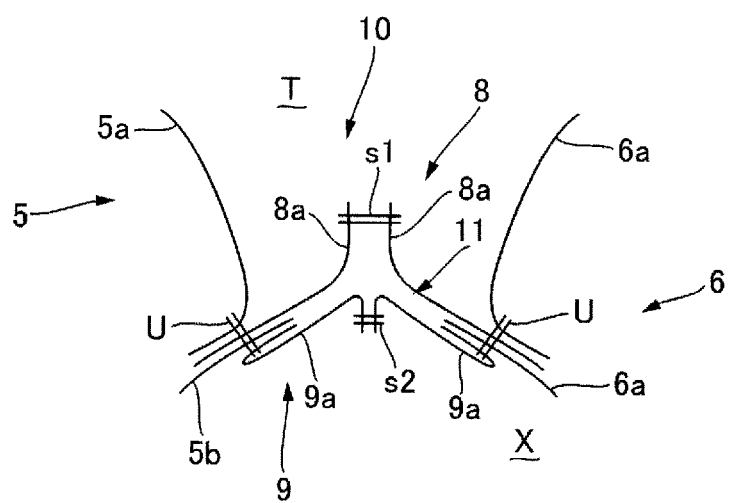
FIG. 18 is an enlarged sectional view of an important part illustrating that the gas passage depicted in FIG. 17 has been closed off.

Now, a second embodiment of the vehicular side airbag apparatus according to the present invention will be described. FIG. 11 is a side view schematically depicting the vehicular side airbag apparatus that is described throughout the specification and that is the same as the vehicular side airbag apparatus in the first embodiment. FIG. 12 is a side view of the vehicular side airbag apparatus according to the second embodiment. FIG. 13 is a diagram illustrating that components of the vehicular side airbag apparatus depicted in FIG. 11 have been assembled together. FIG. 14 is a sectional view taken along line A1-A1 in FIG. 12. FIG. 15 is a sectional view taken along line A2-A2 in FIG. 12. FIG. 16 is a sectional view taken along line A3-A3 in FIG. 12. FIG. 17 is an enlarged perspective view of an important part of the side airbag apparatus located near the section A1-A1, illustrating that the inflator gas flows through a gas passage formed in the vehicular side airbag apparatus depicted in FIG. 12. FIG. 18 is an enlarged sectional view of an important part of the side airbag apparatus illustrating that the gas passage depicted in FIG. 17 has been closed off.

As depicted in FIG. 11, a vehicular side airbag apparatus 1 includes a side airbag 3 that is built into a seatback 2a of a seat 2 and that is deployed and inflated from the vehicular rear toward the vehicular front between the occupant and the vehicle side portion.

As depicted in FIG. 12, the vehicular side airbag apparatus 1 mainly includes the side airbag 3 and an inflator 4 provided inside the side airbag 3. The inflator 4 is fixed to the seatback 2a and arranged in a rear side of the vehicular side airbag apparatus 1 in the vehicular front-rear direction.

The side airbag 3 adopted in the second embodiment includes a vehicular interior panel member 5 and a vehicular exterior panel member 6 as depicted in FIGS. 12 to 18. The panel members 5 and 6 are formed of any of various pliable, flexibly deformable materials that enables the side airbag 3 in a housed state to be deployed and inflated as is well known in the technical field of vehicular airbags. When the side airbag 3 is deployed, vehicular exterior panel member 6 faces the vehicle side portion such as an inner surface of a door or an inner surface of a side window. When the side airbag 3 is deployed, the vehicular interior panel member 5 faces the occupant.

The vehicular interior panel member 5 and the vehicular exterior panel member 6 are contiguously and integrally formed. In this case, a fold line F is set at a boundary (seam) between the vehicular interior panel member 5 and the vehicular exterior panel member 6. The vehicular interior panel member 5 and the vehicular exterior panel member 6 are formed line-symmetrically with respect to the fold line F. When folded along the fold line F, the vehicular interior panel member 5 and the vehicular exterior panel member 6 are snugly laid on top of each other. When the side airbag 3 is built into the seatback 2a, attachment of the side airbag 3 is set such that the position of the fold line F (boundary position) is on the vehicular rear side of the side airbag 3, whereas a side opposite to the fold line F corresponds to the vehicular front side of the side airbag 3.

The vehicular interior panel member 5 and the vehicular exterior panel member 6 may be separately formed and integrally joined together at the boundary position.

In the second embodiment, each of the vehicular interior and exterior panel members 5 and 6 includes upper panel portions 5a and 6a and lower panel portions 5b and 6b. The upper panel portions 5a and 6a are positioned on an upper side of the panel member in the vehicular up-down direction, whereas the lower panel portions 5b and 6b are positioned on a lower side of the panel member in the vehicular up-down direction. The panel portions 5a, 5b, 6a, and 6b are joined together in the up-down direction to form the vehicular interior panel member 5 and the vehicular exterior panel member 6. The upper panel portions 5a and 6a are aligned with the positions of the occupant's shoulder and lumbar. The lower panel portions 5b and 6b are aligned with the position of the occupant's lumbar.

The upper panel portions 5a and 6a and the lower panel portions 5b and 6b are joined together as follows. As depicted in FIG. 12 and FIG. 14, the lower panel portions 5b and 6b are positioned on the inner side, whereas the upper panel portions 5a and 6a are positioned on the outer side. Lower positions of the upper panel portions 5a and 6a are laid on top of upper portions of the lower panel portions 5b and 6b. The upper panel portions 5a and 6a are linearly joined to the lower panel portions 5b and 6b at a junction line located slightly above lower ends of the upper panel portions 5a and 6a serving as references such that the junction proceeds from a front end of the junction line U on the vehicular front side toward a rear end thereof on the vehicular rear side.

The side airbag 3 is shaped into an inflatable bag by joining the vehicular interior and exterior panel members 5 and 6 including the upper and lower panel portions 5a, 5b, 6a, and 6b at an outer-peripheral junction line G along the outer peripheral edges of the panel members 5 and 6 such that the vehicular interior and exterior panel members 5 and 6 are closed.

As depicted in FIG. 12 and FIG. 14, a front up-down partition portion including a first band-like member 8 described below is formed inside the side airbag 3. The front up-down partition portion is formed so as to extend from the front end toward the rear end of the side airbag 3 along the junction line U in the vehicular front-rear direction to a point at a distance from the rear end of the side airbag 3.

Like the panel members 5 and 6, the rear up-down partition portion is formed using the first band-like member 8, which is pliable and flexibly deformable. In the illustrated example, the first band-like member 8 is formed by laying two band pieces 8a on top of each other and joining the band pieces 8a together at first side edges of the band pieces 8a along a seam line s1. The band pieces 8a forming the first band-like member 8 are formed such that the first side edges of the band pieces 8a are joined together along the seam line s1, whereas second side edges of the band pieces 8a can be spread apart from each other.

A longitudinal direction of the first band-like member 8 is aligned with the vehicular front-rear direction. A width direction of the first band-like member 8 is aligned with a direction in which the panel members 5 and 6 are laid on top of each other. The widthwise both edges of the first band-like member 8 are integrally joined to the vehicular interior panel member 5 (5a and 5b) and the vehicular exterior panel member 6 (6a and 6b). The front end of the first band-like member 8 is integrally joined to the vehicular interior panel member 5 and the vehicular exterior panel member 6 at the outer-peripheral junction line G. The rear end 8b of the first band-like member 8 is discontinued at a distance from the rear end of the side airbag 3.

A rear up-down partition portion including a second band-like member 9 described below is formed inside the side airbag 3. The rear up-down partition portion is formed so as to extend from the rear end toward the front end of the side airbag 3 along the junction line U in the vehicular front-rear direction to a point at a distance from the front end of the side airbag 3.

As depicted in FIG. 12 and FIG. 14, the rear up-down partition portion is formed so as to include a portion positioned over the front up-down partition portion. The rear up-down partition portion is formed to lie under the front up-down partition portion and to include an overlap portion 10 that partially faces the front up-down partition portion in the up-down direction.

Like the front up-down partition portion, the rear up-down partition portion is formed using pliable, flexibly deformable band pieces 9a. In the illustrated example, like the first band-like member 8, the second band-like member 9 is formed by laying two band pieces 9a on top of each other and joining the band pieces 9a together at first side edges of the band pieces 9a along a seam line s2. The band pieces 9a forming the second band-like member 9 are also formed such that the first side edges of the band pieces 9a are joined together along the seam line s2, whereas second side edges of the band pieces 9a can be spread apart from each other.

A longitudinal direction of the second band-like member 9 is aligned with the vehicular front-rear direction. A width direction of the second band-like member 9 is aligned with the direction in which the panel members 5 and 6 are laid on top of each other. The widthwise both edges of the second band-like member 9 are integrally joined to the vehicular interior panel member 5 (5a and 5b) and the vehicular exterior panel member 6 (6a and 6b). The rear end of the second band-like member 9 is integrally joined to the vehicular interior panel member 5 and the vehicular exterior panel member 6 at the outer-peripheral junction line G. The front end 9b of the second band-like member 9 is discontinued at a distance from the front end of the side airbag 3.

The inside of the side airbag 3 is partitioned into an upper bag area T in the upper portion of the side airbag 3 and a lower bag area X in the lower portion of the side airbag 3 along the junction line U by the front and rear up-down partition portions extending continuously from the front end to the rear end of the side airbag 3 in the vehicular front-rear direction due to the overlap portion 10 of the rear up-down partition portion. The upper bag area T is defined by the upper panel portions 5a and 6a. The lower bag area X is defined by the lower panel portions 5b and 6b.

When the side airbag 3 is deployed and inflated, the upper bag area T receives the occupant's shoulder and chest, while the lower bag area X receives the occupant's lumbar.

FIG. 14 depicts an example of a junction structure at the overlap portion 10 for the upper panel portions 5a and 6a and the lower panel portions 5b and 6b of the vehicular interior and exterior panel members 5 and 6 forming the side airbag 3, and the first band-like member 8 and the second band-like member 9 of the front and rear up-down partition portions. The junction structure will be described in accordance with a production procedure for the side airbag 3. First, the second band-like member 9 with the band pieces 9a joined together (see s2) is produced (see (I) in FIG. 14).

Before the procedure shifts to the next process, the band pieces 8a of the first band-like member 8 may be laid on top of the outer sides of the lower panel portions 5b and 6b of the vehicular interior panel member 5 and the vehicular exterior panel member 6, and the band pieces 8a may be joined to the lower panel portions 5b and 6b (not depicted in the drawings). At this time, junction of one of the band pieces 8a to the vehicular interior panel member 5 and junction of the other band piece 8a to the vehicular exterior panel member 6 are separately performed. The panel members 5 and 6 are not joined together. At this stage, the first band-like member 8 has not been produced.

Then, the second band-like member 9 is sandwiched between the lower panel portions 5b and 6b of the vehicular interior panel member 5 and the vehicular exterior panel member 6 to align the second band-like member 9 with the position of the junction line U. At this time, the seam line s2 on the band pieces 9a is located on a lower side and below the junction line U so as to allow the second band-like member 9 to be expanded upward.

The upper panel portions 5a and 6a of the vehicular interior panel member 5 and the vehicular exterior panel member 6 are laid on top of the respective outer sides of the band pieces 8a of the first band-like member 8. The components from the upper panel portion 5a of the vehicular interior panel member 5 to one of the band pieces 9a of the second band-like member 9 are collectively joined together. The components from the upper panel portion 6a of the vehicular exterior panel member 6 to the other band piece 9a of the second band-like member 9 are collectively joined together (see (II) in FIG. 14).

This junction results in formation of two junction lines U, one on the vehicular interior panel member 5 and the other on the vehicular exterior panel member 6. Then, on a vehicular interior side with respect to the seam line s2 on the second band-like member 9 as a boundary, the following are sequentially laid on top of one another so as to be integrated together: one of the band pieces 9a of the second band-like member 9, the lower panel portion 5b of the vehicular interior panel member 5, one of the band pieces 8a of the first band-like member 8, and the upper panel portion 5a of the vehicular interior panel member 5. On a vehicular exterior side, the following are sequentially laid on top of one another so as to be integrated together: the other band piece 9a of the second band-like member 9, the lower panel portion 6b of the vehicular exterior panel member 6, the other band piece 8a of the first band-like member 8, and the upper panel portion 6a of the vehicular exterior panel member 6.

Finally, the band pieces 8a of the first band-like member 8 are joined together at the upper ends thereof (see the seam line s1 forming the first band-like member 8) (see (III) in FIG. 14).

Thus, the first band-like member 8 is produced, and at the same time, the overlap portion 10 facing the front up-down partition portion in the up-down direction is defined by the second band-like member 9 held, in a sandwiched manner, by the first band-like member 8 covering the lower panel portions 5b and 6b from above. At this time, the seam line s1 on the band pieces 8a is located on an upper side and above the junction line U so as to allow the first band-like member 8 to be expanded downward. Although not depicted in the drawings, a reinforcement cloth may be arranged so as to lie on top of the band piece 8a.

In this final form, the first band-like member 8 forming the front up-down partition portion is joined to the lower panel portions 5b and 6b such that the both side edges of the first band-like member 8 bridge the upper positions of lower panel portions 5b and 6b of the vehicular interior panel member 5 and the vehicular exterior panel member 6. The both side edges of second band-like member 9 are joined to the upper panel portions 5a and 6a integrally with the lower panel portions 5b and 6b and the first band-like member 8 such that the second band-like member 9 is sandwiched between the upper portions of the lower panel portions 5b and 6b. Thus, the overlap portion 10 is formed.

The side airbag 3 is formed by joining the panel members 5 and 6 together at the outer-peripheral junction line G such that the front up-down partition portion and the rear up-down partition portion are formed in the vehicular interior panel member 5 and the vehicular exterior panel member 6 as described above.

The inflator 4 is provided to feed an inflator gas H into the upper bag area T. Specifically, the inflator 4 is arranged in the upper bag area T inside the side airbag 3.

The flexibly deformable second band-like member 9 allows at least the overlap portion 10 of the rear up-down partition portion to be formed to be flexibly deformable. Between the overlap portion 10 and the front up-down partition portion, a hollow tubular a gas passage 11 is defined by the overlap portion 10 and the front up-down partition portion lying opposite to each other as depicted in FIG. 14 and FIG. 17.

An inlet 11a of the gas passage 11 communicating with the upper bag area T is defined by the rear end of the front up-down partition portion discontinued above the rear up-down partition portion. An outlet 11b of the gas passage 11 communicating with the lower bag area X is defined by the front end of the rear up-down partition portion discontinued below the front up-down partition portion.

The inflator gas H fed into the upper bag area T expands and inflates the upper bag area T. The inflator gas H expanding the upper bag area T opens the inlet 11a of the gas passage 11 to expand the gas passage 11, into which the inflator gas H flows. Since the overlap portion 10 and the front up-down partition portion are flexibly deformable, the gas passage 11 is expanded by the flowing inflator gas H to open the outlet 11b of the gas passage 11. The inflator gas H is fed into the lower bag area X through the outlet 11b.

When the lower bag area X is deployed and inflated and the inflator gas H acts on the overlap portion 10 facing the lower bag area X, specifically, when a gas pressure acts on the overlap portion 10, a portion of the second band-like member 9 located at the overlap portion 10 is pushed up toward the first band-like member 8 of the front up-down partition portion and flexibly deformed as depicted in FIG. 18.

For the dimensions of the gas passage 11, a lower half of the gas passage 11 defined by the second band-like member 9 is defined between the two junction lines U and the seam line s2. An upper half of the gas passage 11 defined by portions of the first band-like member 8 located above the lower panel portions 5b and 6b is similarly defined by the seam line s1 and the two junction lines U. The dimensions of the upper half of the gas passage 11 are set to be substantially equal to the dimensions of the lower half of the gas passage 11. The second band-like member 9 flexibly deformed and pushed up by the inflator gas H is brought in tight contact with the first band-like member 8. As a result, the gas passage 11 is closed off.

Now, effects of the vehicular side airbag apparatus 1 according to the second embodiment will be described. The inflator gas H injected from the inflator 4 is set to be mostly injected downward in the vehicular up-down direction. The inflator gas H is first fed into the upper bag area T, which starts to be deployed and inflated. At the same time, the inflator gas H mostly flows downward, and thus, a relatively large amount of inflator gas H flows into the gas passage 11 and is then fed into the lower bag area X. The lower bag area X is deployed and inflated in conjunction with deployment and inflation of the upper bag area T.

The lower bag area X is gradually filled with the inflator gas H to increase the pressure in the lower bag area X. When the pressure in the lower bag area X reaches a set pressure, specifically, the pressure at which the overlap portion 10 is flexibly deformed upward and brought into tight contact with the front up-down partition portion, the gas passage 11 is closed off to block the feeding of the inflator gas H into the lower bag area X, while inhibiting a reflux to the upper bag area T.

In the first band-like member 8 in the front up-down partition portion, after the feeding of the inflator gas H into the lower bag area X is blocked, the inflator gas H fed into the upper bag area T further acts to flexibly deform the first band-like member 8 so as to push the first band-like member 8 down toward the portion of the second band-like member 9 located at the overlap portion 10. This enhances the closure of the gas passage 11.

The upper bag area T is subsequently filled with the inflator gas H, and deployment and inflation of the upper bag area T are continued. That is, the lower bag area X with a relatively small capacity, which receives the occupant's lumbar, completes inflation at the set pressure, thus closing the gas passage 11 off. Subsequently, with a slight delay, the upper bag area T with a relatively large capacity, which receives the occupant's shoulder and chest, completes inflation at the set pressure.

In the vehicular side airbag apparatus 1 according to the second embodiment, the overlap portion 10 is set on the front and rear up-down partition portions that partition the interior of the side airbag 3 into the upper and lower bag areas T and X, and is used to form the gas passage 11 that can be closed off. The inflator gas H fed into the lower bag area X via the gas passage 11 allows the gas passage 11 to be closed off. This allows simultaneous provision of a function to form a plurality of bag areas T and X inside the side airbag 3 and a function to control a flow of the inflator gas H to adjust the internal pressures in the bag areas T and X.

In particular, the function to inhibit a reflux of the inflator gas is provided for the partitions (first band-like member 8 and second band-like member 9) that partition the interior of the side airbag 3 into the plurality of bag areas T and X. This allows formation of the bag areas T and X and adjustment of the internal pressures in the bag areas T and X to be achieved at once.

In this case, only two components, the front and rear up-down partition portions (first and second band-like members 8 and 9) are needed, providing a simple configuration and achieving a simple structure, more easy and efficient assembly operations, and high productivity.

The first band-like member 8 forming the front up-down partition portion can be assembled into the side airbag 3 using simple and easy assembly operations, that is, simply by integrally joining the widthwise both side edges of the first band-like member 8 to the vehicular interior and exterior panel members 5 and 6, and integrally joining the front end of the first band-like member 8 to the panel members 5 and 6 along the outer-peripheral junction line G. Furthermore, since the assembly operations are not complicated, junction can be achieved at a high junction strength, allowing a side airbag 3 with stable performance to be manufactured with high quality.

Like the first band-like member 8, the second band-like member 9 forming the rear up-down partition portion can be assembled into the side airbag 3 using simple and easy assembly operations, that is, simply by integrally joining the widthwise both side edges of the second band-like member 9 to the vehicular interior and exterior panel members 5 and 6 and integrally joining the rear end of the second band-like member 9 to the panel members 5 and 6 along the outer-peripheral junction line G. Furthermore, since the assembly operations are not complicated, junction can be achieved at a high junction strength, allowing a side airbag 3 with stable performance to be manufactured with high quality.

The vehicular interior panel member 5 and the vehicular exterior panel member 6 include the upper panel portions 5a and 6a and the lower panel portions 5b and 6b, and the upper and lower panel portions 5a, 5b, 6a and 6b are joined together by being laid on top of one another. Consequently, when the front and rear up-down partition portions are formed, specifically, when the side airbag 3 is produced by joining the first and second band-like members 8 and 9 to the panel members 5 and 6, assembly of the components around the overlap portion 10 can be facilitated, allowing manufacturability to be improved.

The junction lines U on the panel portions 5a, 5b, 6a, and 6b can be utilized to form the front and rear up-down partition portions, that is, to join the first and second band-like members 8 and 9 together. This junction, compared to junction of the first band-like members 8 and 9 at positions different from the junction lines U, enables manufacture using a reasonable assembly procedure.

The both side edges of the first band-like member 8 are jointed to the lower panel portions 5b and 6b such that the first band-like member 8 bridges the upper portions of the lower panel portions 5b and 6b included in the vehicular interior panel member 5 and the vehicular exterior panel member 6, respectively. The both side edges of the second band-like member 9 are formed so as to be joined to the upper panel portions 5a and 6a integrally with the lower panel portions 5b and 6b and the first band-like member 8 such that the second band-like member 9 is sandwiched between upper portions of the lower panel portions 5b and 6b. This allows a structure to be rigidly configured which includes the gas passage 11 defined by the front and rear up-down partition portions and which separates the upper bag area T from the lower bag area X. Consequently, a side airbag 3 with stable performance can be manufactured with high quality.

The lower bag area X is faced only by the overlap portion 10 with no overlap, and thus, the inflator gas H allows the overlap portion 10 to be adequately flexibly deformed. Consequently, the gas passage 11 can be reliably closed off to produce an excellent pressure adjustment effect. The second embodiment of course produces effects that are exerted by the first embodiment.

Figure 19:
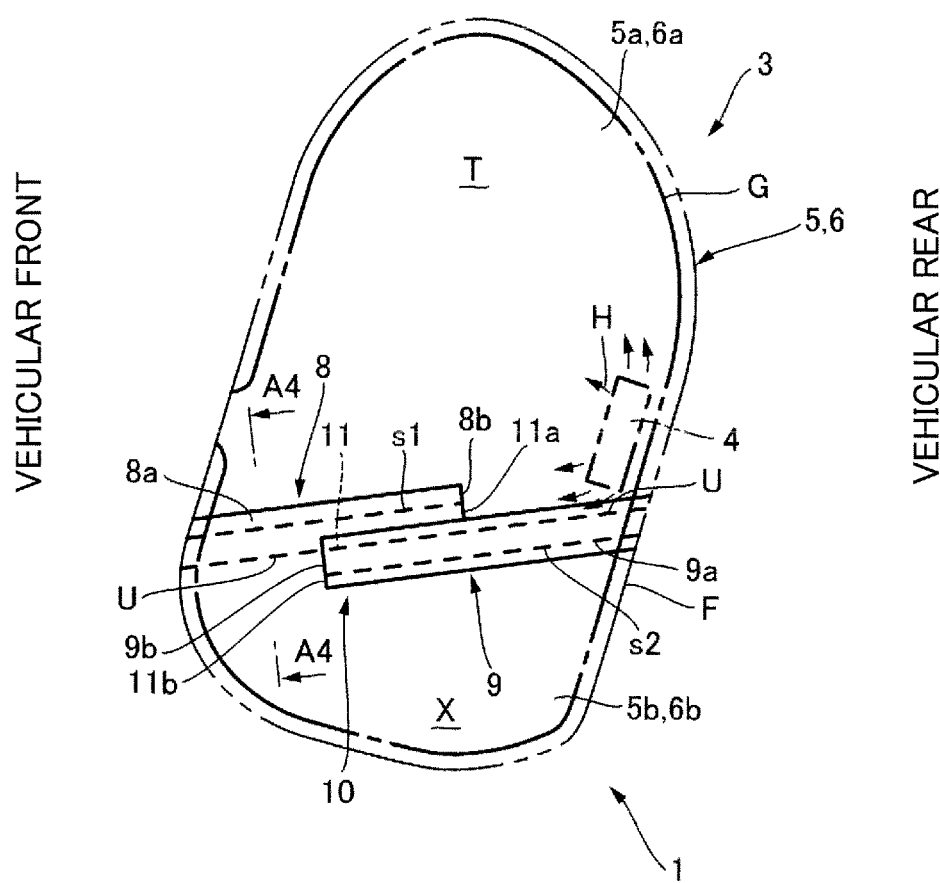
FIG. 19 is a side view depicting a variation of the second embodiment of the vehicular side airbag apparatus according to the present invention.
Figure 20:
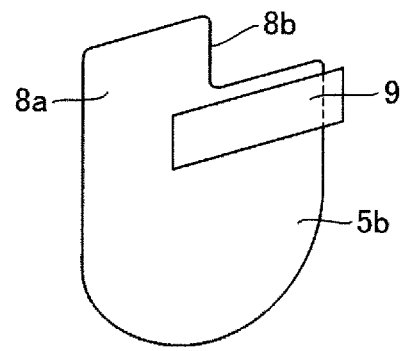
FIG. 20 is a diagram illustrating how components of the vehicular side airbag apparatus depicted in FIG. 19 are assembled.
Figure 21:
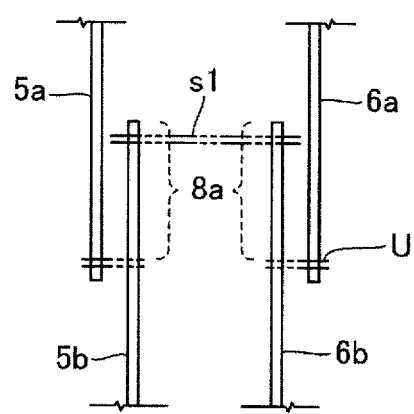
FIG. 21 is a sectional view taken along line A4-A4 in FIG. 19.

FIGS. 19 to 21 depict a variation of the second embodiment. FIG. 19 is a side view depicting a variation of a vehicular side airbag apparatus according to the second embodiment. FIG. 20 is a diagram illustrating how components of the vehicular side airbag apparatus depicted in FIG. 19. FIG. 21 is a sectional view taken along line A4-A4 in FIG. 19. In the second embodiment, the band pieces 8a of the first band-like member 8 are each provided as separate component. However, as depicted in the figures, the lower panel portions 5b and 6b may be extended upward so that the band pieces 8a can be integrally provided on the lower panel portions 5b and 6b. In this case, portions of the lower panel portions 5b and 6b corresponding to the band pieces 8a partially protrude upward from the lower panel portions 5b and 6b. Even such a variation of course produces effects similar to effects exerted by the second embodiment.

Figure 22:
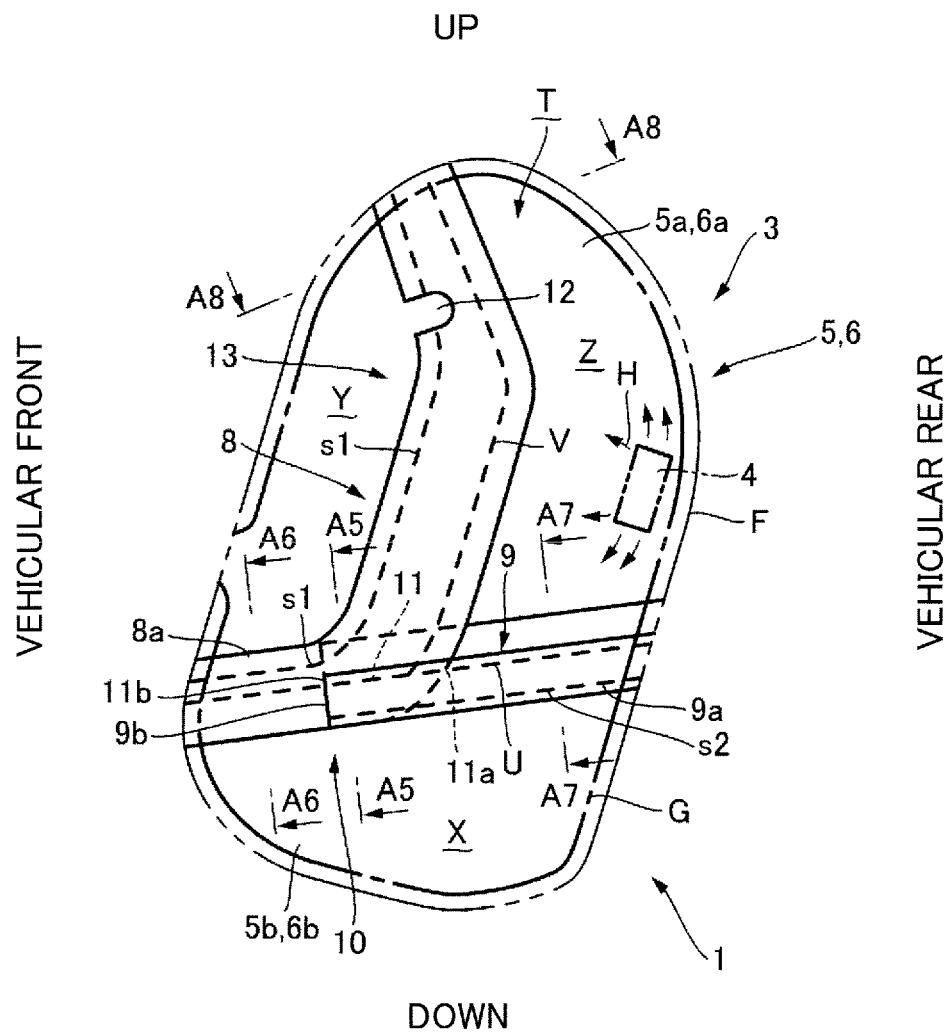
FIG. 22 is a side view depicting a third embodiment of the vehicular side airbag apparatus according to the present invention.
Figure 23:
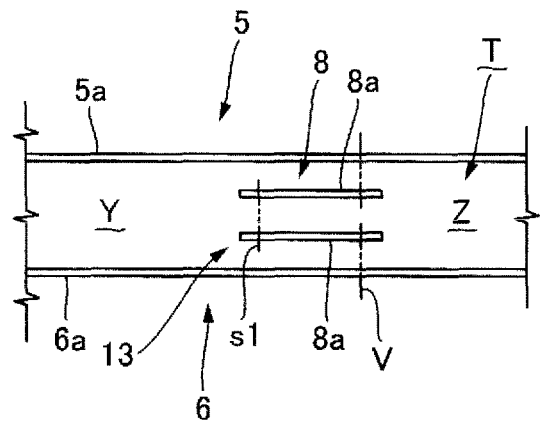
FIG. 23 is a sectional view taken along line A8-A8 in FIG. 22.
Figure 24:
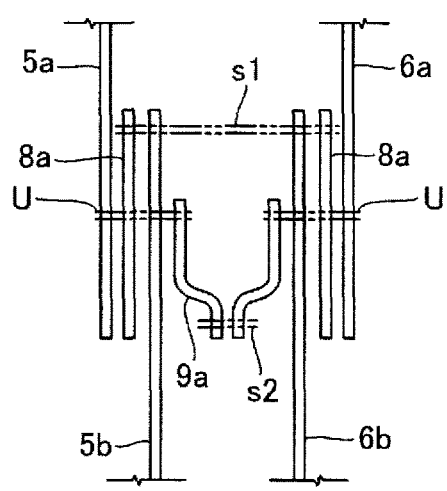
FIG. 24 is a sectional view taken along line A5-A5 in FIG. 22.
Figure 25:
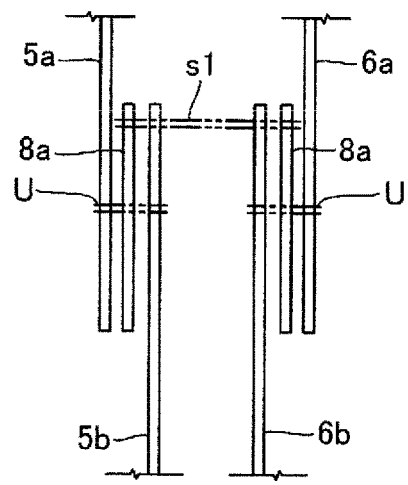
FIG. 25 is a sectional view taken along line A6-A6 in FIG. 22.
Figure 26:
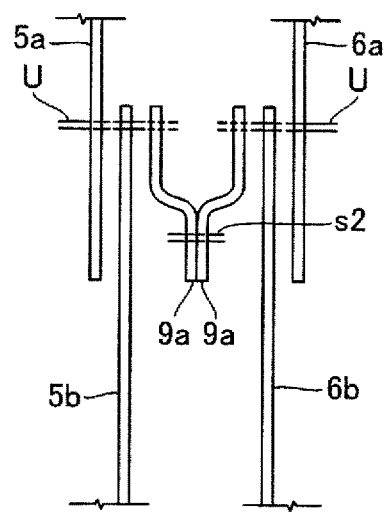
FIG. 26 is a sectional view taken along line A7-A7 in FIG. 22.

FIGS. 22 to 26 depict a vehicular side airbag apparatus 1 according to the third embodiment. FIG. 22 is a side view of the vehicular side airbag apparatus 1 according to the third embodiment. FIG. 23 is a sectional view taken along line A8-A8 in FIG. 22. FIG. 24 is a sectional view taken along line A5-A5 in FIG. 22. FIG. 25 a sectional view taken along line A6-A6 in FIG. 22. FIG. 26 is a sectional view taken along line A7-A7 in FIG. 22.

The front up-down partition portion includes an upper extension portion 13 extended continuously from a rear end thereof, which is, in the second embodiment, located in the middle of the side airbag in the vehicular front-rear direction, toward the upper side in the vehicular up-down direction, the upper extension portion 13 reaching the upper end of the side airbag 3.

The upper extension portion 13 is an extension portion of the first band-like member 8. An upper end of the upper extension portion 13 is integrally joined to the vehicular interior and exterior panel members 5 and 6 along the outer-peripheral junction line G. The upper extension portion 13 partitions the interior of the side airbag 3 in the vehicular front-rear direction to divide the upper bag area T into a front upper bag area Y and a rear upper bag area Z as depicted by imaginary lines in FIG. 11. The rear upper bag area Z is aligned with the occupant's shoulder position. The front upper bag area Y is aligned with the occupant's chest position.

The upper extension portion 13 has a gas introduction path 12 through which the inflator gas H injected from the inflator 4 arranged in the rear side of the side airbag in the vehicular front-rear direction into the rear upper bag area Z is fed into the front upper bag area Y. The gas introduction path 12 includes a hole, a cutout, or the like formed to penetrate the first band-like member 8.

A sectional view taken along line A5-A5 in FIG. 22 depicts a junction structure substantially the same as the junction structure depicted in FIG. 14. In the second embodiment, the lower panel portions 5b and 6b are simultaneously sewn along the seam line s1 (see FIG. 14) at a front portion of the band piece 8a of the first band-like member 8 forming the front up-down partition portion. The seam line s1 enables reinforcement.

When the upper extension portion 13 is formed, an up-down seam line V branches upward from the junction lines U in FIG. 14, as depicted in FIG. 22 and FIG. 23. The first band-like member 8 formed by joining first side edges of the band pieces 8a together along the seam line s1 are integrally joined, at second side edges of the band pieces 8a, to the vehicular interior and exterior panel member 5 and 6 along the up-down seam line V. As a result, the upper bag area T is divided into front and rear parts.

Even the third embodiment of course produces effects similar to the effects of the second embodiment. In the third embodiment, since the front up-down partition portion includes the upper extension portion 13, the gas passage 11 that can be closed off provides the flux inhibition function or the pressure adjustment function, and the three bag areas X, Y, and Z can be formed. Thus, the occupant's lumbar, shoulder, and chest can be appropriately received to improve occupant protect performance.

Figure 27:
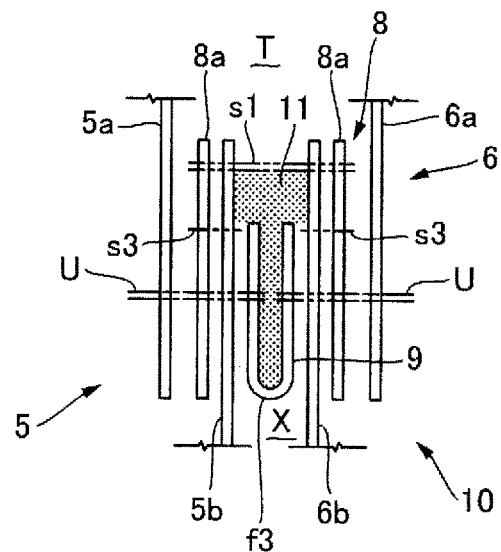
FIG. 27 is a sectional view depicting a variation of a junction structure at an overlap portion depicted in FIG. 14.
Figure 28:
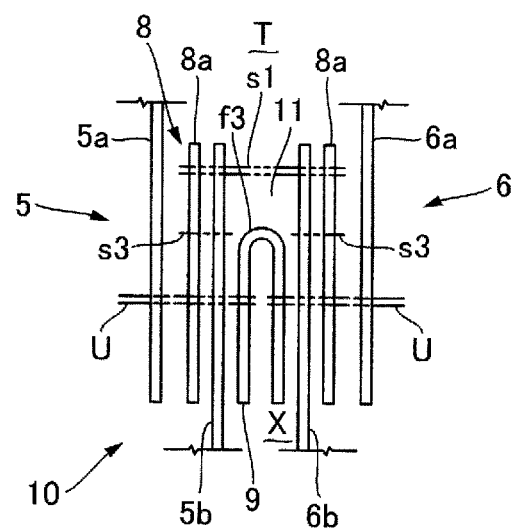
FIG. 28 is a sectional view depicting another variation of the junction structure at the overlap portion depicted in FIG. 14.
Figure 29:
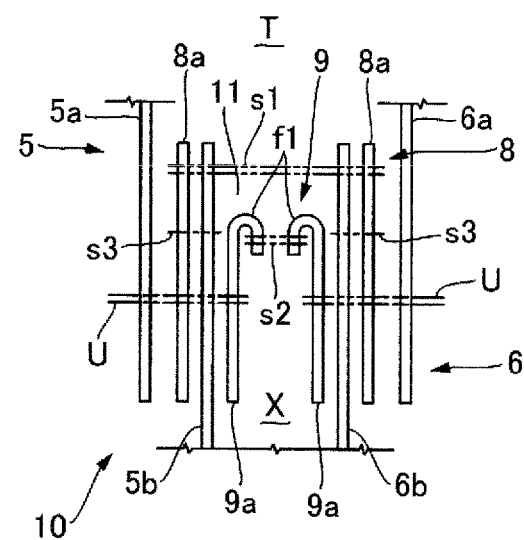
FIG. 29 is a sectional view depicting yet another variation of the junction structure at the overlap portion depicted in FIG. 14.

FIGS. 27 to 29 depict variations of the junction structure at the overlap portion 10 in the second and third embodiments. FIG. 27 illustrates a case in which, instead of forming the second band-like member 9 through junction of the two band pieces 9a along the seam line s2, one band piece is used as the second band-like member 9 and a folded portion f3 is formed at the position of the seam line by folding the second band-like member 9 upward. FIG. 28 illustrates a case in which the second band-like member 9 depicted in FIG. 27 is turned upside down and the folded portion f3 is formed by folding the second band-like member 9 downward. When the second band-like member 9 is formed by folding back one band piece and assembling the folded band piece into the side airbag. This configuration, compared to a configuration in which the band pieces 9a are joined together, enables a reduction in the number of processes, allowing manufacturability to be improved.

FIG. 29 illustrates that the second band-like member 9 depicted in FIG. 14 is arranged upside down. When the second band-like member 9 in FIG. 14 is simply turned upside down, the seam line s2 appears in the gas passage 11 to hinder the gas passage 11 from being closed off. In the structure depicted in FIG. 29, the second band-like member 9 is formed by folding back the two band pieces 9a depicted in FIG. 14 such that the band pieces 9a wrap the seam line s2 and arranging the folded portion f1 so as to make the folded portion f1 face the gas passage 11. Then, even when the second band-like member 9 is arranged upside down, the gas passage 11 can be appropriately closed off.

Figure 30:
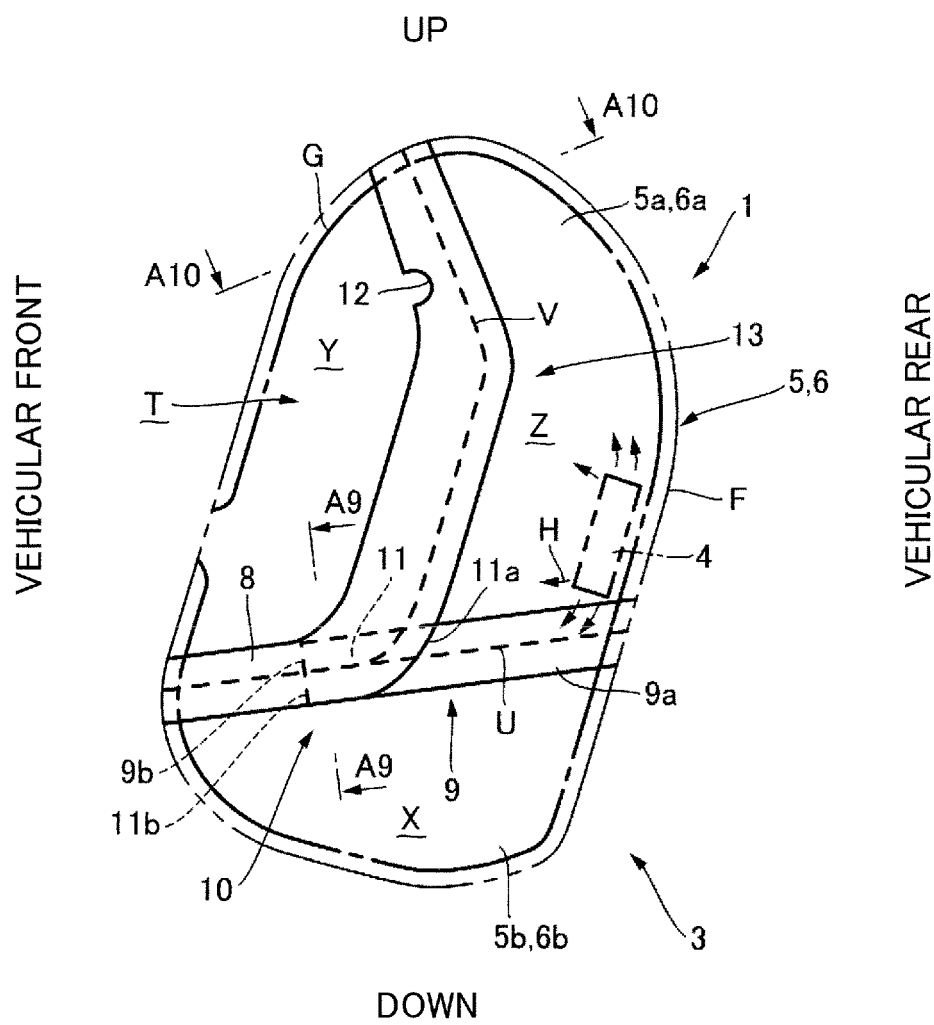
FIG. 30 is a side view depicting a fourth embodiment of the vehicular side airbag apparatus according to the present invention.
Figure 31:
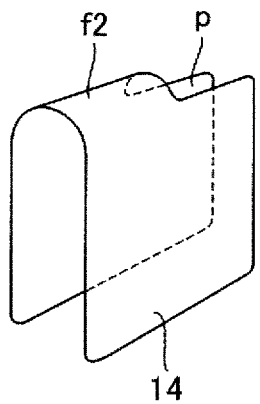
FIG. 31 is a perspective view of a lower panel portion included in the vehicular side airbag apparatus depicted in FIG. 30.
Figure 32:
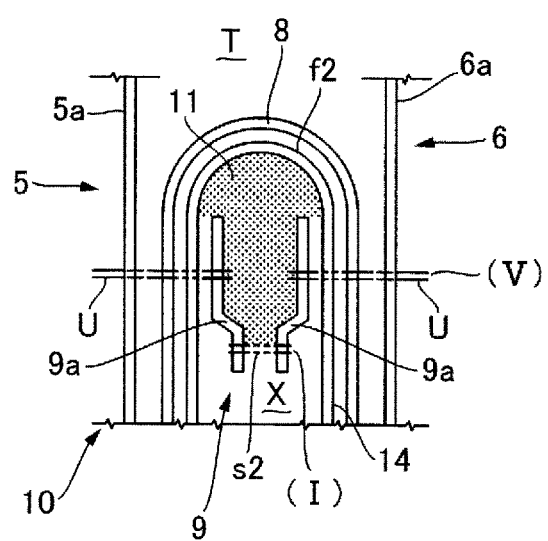
FIG. 32 is a sectional view taken along line A9-A9 in FIG. 30.
Figure 33:
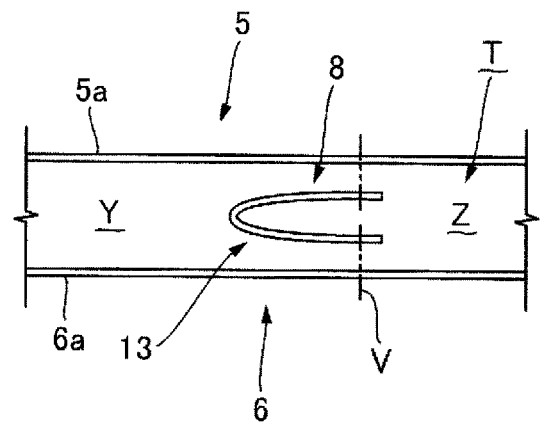
FIG. 33 is a sectional view taken along line A10-A10 in FIG. 30.

FIGS. 30 to 34 depict a vehicular side airbag apparatus 1 according to a fourth embodiment. FIG. 30 is a side view of the vehicular side airbag apparatus 1 according to the fourth embodiment. FIG. 31 is a perspective view of the lower panel portion included in the vehicular side airbag apparatus depicted in FIG. 30. FIG. 32 is a sectional view taken along line A9-A9 in FIG. 30. FIG. 33 is a sectional view taken along line A10-A10 in FIG. 30.

In the fourth embodiment, the front up-down partition portion includes the upper extension portion 13, and the rear upper bag area Z, the front upper bag area Y, and the lower bag area X are formed inside the side airbag 3, as is the case with the third embodiment. In the upper extension portion 13, the gas introduction path 12 is formed through which the inflator gas H injected from the inflator 4 arranged in the rear side of the side airbag in the vehicular front-rear direction into the rear upper bag area Z is fed into the front upper bag area Y, as is the case with the third embodiment.

The fourth embodiment relates to a variation of the first band-like member 8 and lower panel portions 5b and 6b described above. In the above-described embodiments, the first band-like member 8 is formed by joining the two band pieces 8a along the seam line s1. Alternatively, in the fourth embodiment, the first band-like member 8 is formed by folding back the band pieces 8a at the position of a seam line. A lower panel portion 14 may also be formed as a single member in which a mountain fold portion f2 is formed such that the lower panel portion 14 curves upward from the interior to the exterior, rather than being joined at the upper ends. The junction structure in this case is depicted in FIG. 32. First, the band pieces 9a are joined together to produce the second band-like member 9 (see (I) in FIG. 32).

Then, the folded first band-like member 8 is laid on top of the lower panel portion 14 having the mountain fold portion f2 so as to stride over the mountain fold portion f2. The second band-like member 9 is held by the mountain fold portion f2 of the lower panel portion 14 in a sandwiched manner. At this time, the second band-like member 9 is aligned with the position of the junction lines U. The seam line s2 on the band pieces 9a of the second band-like member 9 is located on the lower side and below the junction lines U so as to allow the first band-like member 8 to be expanded upward.

The upper panel portions 5a and 6a of the panel members 5 and 6 are laid on top of the respective outer sides of the first band-like member 8. The components from the upper panel portion 5a of the vehicular interior panel member 5 to one of the band pieces 9a of the second band-like member 9 are collectively joined together. The components from the upper panel portion 6a of the vehicular exterior panel member 6 to the other band piece 9a of the second band-like member 9 are collectively joined together (see (V) in FIG. 32).

This junction results in formation of the junction line U to be formed on each of the vehicular interior and exterior panel members 5 and 6 as is the case with the above-described embodiments. Then, on the vehicular interior side with respect to the seam line s2 on the second band-like member 9 as a boundary, the following are sequentially laid on top of one another so as to be integrated together: one of the band pieces 9a of the second band-like member 9, a vehicular interior portion of the lower panel portion 14, the first band-like member 8, and the upper panel portion 5a of the vehicular interior panel member 5. On the vehicular exterior side, the following are sequentially laid on top of one another so as to be integrated together: the other band piece 9a of the second band-like member 9, a vehicular exterior portion of the lower panel portion 14, the first band-like member 8, and the upper panel portion 6a of the vehicular exterior panel member 6. As depicted in FIG. 31, the mountain fold portion f2 of the lower panel portion 14 is configured such that a vehicular rear side of the mountain fold portion f2 is open (as depicted by p in FIG. 31).

Thus, the second band-like member 9 held, in a sandwiched manner, by the first band-like member 8 that strides over the lower panel portion 14 forms, on the rear up-down partition portion, the overlap portion 10 that faces the front up-down partition portion in the up-down direction.

In this final form, in short, the mountain fold portion f2 is formed on the upper portion of the lower panel portion 14 such that the lower panel portion 14 curves upward. The first band-like member 8 is laid on top of lower panel portion 14 so as to stride over the mountain fold portion f2. The both edges of the second band-like member 9 are joined to the upper panel portions 5a and 6a integrally with the lower panel portion 14 and the first band-like member 8 to form the overlap portion 10.

On the upper extension portion 13, an up-down seam line V branches upward from the junction lines U in FIG. 30, as depicted in FIG. 30 and FIG. 33. For the first band-like member 8 resulting from folding back, the both side edges thereof that are joined to the upper panel portions 5a and 6a along the junction line U are integrally joined to the vehicular interior and exterior panel members 5 and 6 along the up-down seam line V.

Even the fourth embodiment as described above of course produces effects similar to the effect of the second and third embodiments. In the fourth embodiment, the lower panel portion 14 is a single member folded back at the mountain fold portion f2. Thus, the fourth embodiment allows assembly operations to be more easily and efficiently performed compared to a case where the separate lower panel portions are provided on the vehicular interior side and the vehicular exterior side, respectively. Compared to junction of the band pieces 8a, assembly of the folded first band-like member 8 enables a reduction in man-hour to improve manufacturability.

Figure 34:
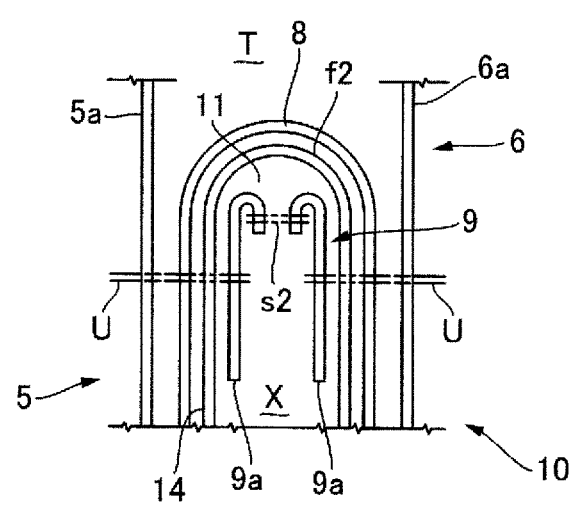
FIG. 34 is a sectional view depicting still another variation of the junction structure at the overlap portion depicted in FIG. 14.

FIG. 34 depicts a variation of the junction structure at the overlap portion 10 that is configured as depicted in FIGS. 27 to 29 and in which the lower panel portion 14 and the first band-like member 8 further have a folded structure. Compared to FIG. 29, FIG. 34 illustrates that the lower panel portion 14 and the first band-like member 8 are folded back.

Figure 35:
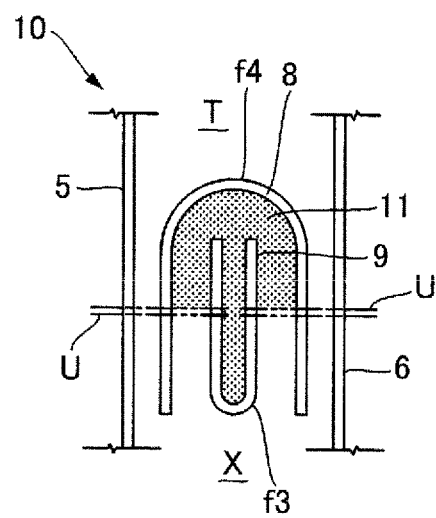
FIG. 35 is a sectional view depicting further another variation of the junction structure at the overlap portion depicted in FIG. 14.
Figure 36:
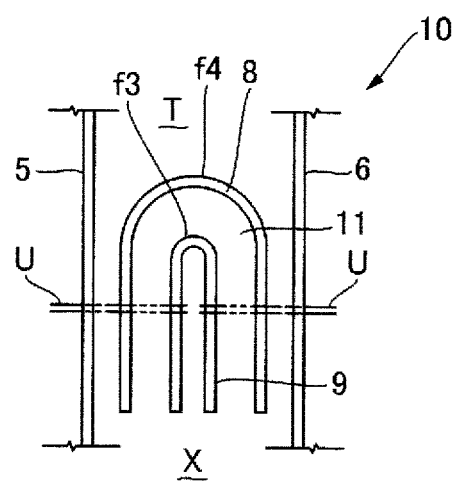
FIG. 36 is a sectional view depicting further another variation of the junction structure at the overlap portion depicted in FIG. 14.

FIG. 35 and FIG. 36 depict variations of the junction structure at the overlap portion 10. In these variations, the vehicular interior panel member 5 and the vehicular exterior panel member 6 include none of the upper and lower panel portions 5a, 5b, 6a, and 6b and are each formed as a single member extending in the vehicular up-down direction.

In FIG. 35, the first band-like member 8 having a mountain fold portion f4 resulting from downward folding is laid on top of the second band-like member 9 having an upward folded portion f3. The first and second band-like members 8 and 9 are sandwiched between the vehicular interior and exterior panel members 5 and 6.

In FIG. 36, the first band-like member 8 having the mountain fold portion f4 resulting from downward folding is laid on top of the second band-like member 9 having a downward folded portion f3. The first and second band-like members 8 and 9 are sandwiched between the vehicular interior and exterior panel members 5 and 6.

In any of these cases, the junction is achieved using the junction lines U while avoiding the folded portions f3 and f4. On the vehicular interior side with respect to the folded portion f3 of the second band-like member 9 as a boundary, the second band-like member 9, the first band-like member 8, and the vehicular interior panel member 5 are sequentially laid on top of one another so as to be integrated together. On the vehicular exterior side with respect to the folded portion f3 of the second band-like member 9 as a boundary, the second band-like member 9, the first band-like member 8, and the vehicular exterior panel member 6 are sequentially laid on top of one another so as to be integrated together.

In short, in these variations, the first band-like member 8 has the mountain fold portion f4 resulting from downward folding. Furthermore, the both side edges of the second band-like member 9 are joined to the vehicular interior panel member 5 and the vehicular exterior panel member 6 integrally with the first band-like member 8 such that the second band-like member 9 is held by the mountain fold portion f4 of the first band-like member 8 in a sandwiched manner, thus forming the overlap portion 10.

Even these variations of course produce effects similar to the effects of the above-described embodiments. The variations are produced simply by forming the vehicular interior and exterior panel members 5 and 6 as single members, and assembling the first and second band-like members 8 and 9 between the panel members 5 and 6. Thus, a reduced number of junctions are needed, and productivity can further be enhanced.

Figure 37:
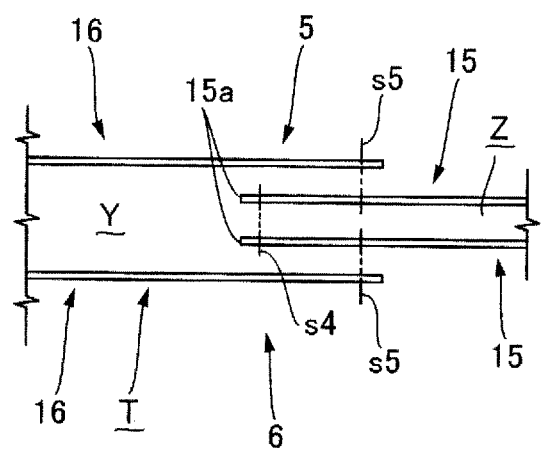
FIG. 37 is a sectional view depicting a variation of the junction structure at the overlap portion depicted in FIG. 14 in which an upper extension portion is formed to extend from a front up-down partitioning portion without the use of a first band-like member, the sectional view being taken along line A8-A8 in FIG. 22.

FIG. 37 depicts a variation in which the upper extension portion is formed to extend from the front up-down partition portion without the use of the first band-like member 8. FIG. 37 corresponds to a sectional view taken along line A8-A8 in FIG. 22.

The vehicular interior and exterior panel members 5 and 6 are formed so as to be divided into vehicular rear panel portions 15 extending from the rear end of the side airbag 3 and having front ends positioned in the vicinity of the seam line s1 on the first band-like member 8, and vehicular front panel portions 16 extending from the front end of the side airbag 3 and having rear ends positioned in the vicinity of the up-down seam line V continuous with the junction lines U.

The vehicular rear panel portions 15 for the vehicular interior and vehicular exterior panel members 5 and 6 are joined together at the position of front ends 15a (corresponding to the seam line s1 on the first band-like member 8) of the vehicular rear panel portions 15 (see s4). Then, the vehicular front panel portions 16 are laid on top of the joined vehicular rear panel portions 15 from outside. At this time, the second band-like member 9 is sandwiched between the vehicular rear panel portions 15 along the junction lines U. Then, the vehicular front panel portions 16 are joined to the respective adjacent vehicular rear panel portions 15 overlapping each other (see s5).

At this time, the junction s5 is established using the junction line U extending from the front end to the rear end of the side airbag 3 in the vehicular front-rear direction and the up-down seam line V branching upward from the junction lines U. At the position of the junction line U, on each of the vehicular interior and exterior sides, the second band-like member 9 is collectively joined to the vehicular front panel portions 16 via the vehicular rear panel portions 15. This configuration also enables provision of a vehicular side airbag apparatus 1 that produces effects similar to the effects in the above-described embodiments.

For all of the present embodiments, any of various well-known methods such as sawing, bonding, and welding may be adopted for the junction.

The above-described vehicular side airbag apparatuses are preferred examples of the present invention, and other embodiments may be implemented or achieved using various methods. In particular, unless otherwise limited herein, the present invention is not constrained to the detailed shapes, sizes, configurations, or arrangements of the components depicted in the attached drawings. The expressions and terms used herein are intended for description, and the present invention is not limited to these expressions or terms unless otherwise limited herein.

While the above description constitutes the preferred embodiment of the present invention, it will be appreciated that the invention is susceptible to modification, variation and change without departing from the proper scope and fair meaning of the accompanying claims.

FIG. 1
VEHICULAR FRONT

UP
VEHICULAR REAR
DOWN
FIG. 6
VEHICULAR FRONT
UP
VEHICULAR REAR
DOWN
FIG. 7
VEHICLE WIDTH DIRECTION
UP
DOWN
FIG. 9
VEHICULAR FRONT
UP
VEHICULAR REAR
DOWN
FIG. 10
VEHICULAR FRONT
UP
VEHICULAR REAR
DOWN
FIG. 11
VEHICULAR FRONT
UP
VEHICULAR REAR
DOWN
FIG. 12
VEHICULAR FRONT
VEHICULAR REAR
FIG. 13
LAMINATING DIRECTION
FIG. 19
VEHICULAR FRONT
VEHICULAR REAR
FIG. 22
VEHICULAR FRONT
UP
VEHICULAR REAR
DOWN
FIG. 30
VEHICULAR FRONT
UP
VEHICULAR REAR
DOWN

What is claimed is:

1. A vehicular side airbag apparatus in the form of a side airbag that is built into a seatback and that is deployed and inflated from a vehicular rear direction toward a vehicular front direction through a gap between an occupant and a vehicular side portion when an inflator gas is fed into the side airbag, the vehicular side airbag apparatus comprising:
the side airbag, which is formed by joining, along an outer peripheral seam line, outer peripheral edges of a vehicular interior panel and a vehicular exterior panel that face each other, the side airbag forming three chambers including a lumbar restraining chamber, a shoulder restraining chamber, and a chest restraining chamber inside the side airbag, and
an inflator that injects the inflator gas is provided in a vehicular rear portion inside the side airbag,
wherein a main portion of the side airbag is formed of at least one of the shoulder and lumbar restraining chambers,
wherein the side airbag is attached to the seatback such that a vehicular rear portion of the main portion is inflated inside the seatback,
wherein the three chambers are separated from one another by a first baffle and a second baffle,
wherein the first baffle is shaped like a band having a width in a vehicular width direction and extends in a vehicular front-rear direction inside the side airbag, and is joined, at a longitudinally rear end of the first baffle, to a rear edge of the side airbag, wherein the first baffle is formed using one panel material and is joined at both side edges of the first baffle, to the vehicular interior panel and the vehicular exterior panel, respectively, and is simultaneously joined, at the longitudinally rear end of the first baffle, to the outer peripheral seam line, and
wherein the second baffle is shaped like a band having a width in the vehicular width direction and extends in a vehicular up-down direction inside the side airbag, and has a baffle overlap area which is set at an intermediate position of the second baffle and to which a longitudinally front end of the first baffle is connected along with the vehicular interior panel and the vehicular exterior panel, and both ends of the second baffle are joined to an outer peripheral edge of the side airbag.

2. The vehicular side airbag apparatus according to claim 1, wherein in the baffle overlap area, an angle formed by the second baffle and the first baffle on a side facing the inflator is set to an acute angle.

3. The vehicular side airbag apparatus according to claim 1, wherein the second baffle is formed using one panel material and is joined, at both side edges of the second baffle, to the vehicular interior panel and the vehicular exterior panel, respectively, and is simultaneously joined to the outer peripheral seam line at a longitudinally upper end of the second baffle that extends at least from the baffle overlap area toward an upper side of the side airbag.

4. The vehicular side airbag apparatus according to claim 1, wherein the second baffle is formed using one panel material, is joined, at the both side edges of the second baffle, to the vehicular interior panel and the vehicular exterior panel, respectively, and is simultaneously joined to the outer peripheral seam line at a longitudinally lower end of the second baffle that extends at least from the baffle overlap area toward a lower side of the side airbag.

5. The vehicular side airbag apparatus according to claim 1, wherein the first baffle includes at least two panel pieces with substantially the same length and substantially the same width,
the first baffle is formed by joining together first side edges of the panel pieces in the longitudinal direction between the vehicular interior panel and the vehicular exterior panel,
second side edges of the panel pieces of the first baffle are joined to the vehicular interior panel and the vehicular exterior panel, respectively, and
the longitudinally rear end of the first baffle is simultaneously joined to the outer peripheral seam line.

6. The vehicular side airbag apparatus according to claim 1, wherein the second baffle includes at least two panel pieces with substantially the same length and substantially the same width,
the second baffle is formed by joining together first side edges of the panel pieces in the longitudinal direction between the vehicular interior panel and the vehicular exterior panel,
second side edges of the panel pieces of the second baffle are joined to the vehicular interior panel and the vehicular exterior panel, respectively, and
a longitudinally upper end of the second baffle that extends at least from the baffle overlap area toward an upper side of the side airbag is simultaneously joined to the outer peripheral seam line.

7. The vehicular side airbag apparatus according to claim 1, wherein the second baffle includes at least two panel pieces with substantially the same length and substantially the same width, the second baffle is formed by joining together first side edges of the panel pieces in the longitudinal direction between the vehicular interior panel and the vehicular exterior panel, second side edges of the panel pieces of the second baffle are joined to the vehicular interior panel and the vehicular exterior panel, respectively, and a longitudinally lower end of the second baffle that extends at least from the baffle overlap area toward a lower side of the side airbag is simultaneously joined to the outer peripheral seam line.

8. The vehicular side airbag apparatus according to claim 1, wherein a flexible sleeve having openings at both ends thereof is provided inside the side airbag so as to surround the inflator and to penetrate the first baffle, and the flexible sleeve is deformed by the inflator gas flowing into one of the shoulder and lumbar restraining chambers partitioned from each other by the first baffle to inhibit the inflator gas from flowing out toward the other of the shoulder and lumbar restraining chambers.

9. The vehicular side airbag apparatus according to claim 8, wherein the inflator is shaped like a cylinder, has a plurality of gas injection holes arranged in a circumferential direction near one of longitudinal both ends of the inflator and has a connector for supply of an ignition signal provided at the other longitudinal end of the inflator, an opening through which an interior and an exterior of the side airbag are connected together is formed in the vehicular rear portion of the side airbag such that the connector is exposed to the outside of the side airbag and the gas injection holes are arranged inside the side airbag, and the inflator is installed so as to penetrate the opening.

10. The vehicular side airbag apparatus according to claim 1, wherein upon inflation of the side airbag the inflator gas is first supplied to inflate the shoulder restraining chamber and thereafter the lumbar restraining chamber is inflated.

11. A vehicular side airbag apparatus in the form of a side airbag that is built into a seatback and that is deployed and inflated from a vehicular rear direction toward a vehicular front direction through a gap between an occupant and a vehicular side portion when an inflator gas is fed into the side airbag, the vehicular side airbag apparatus comprising:

the side airbag, which is formed by joining, along an outer peripheral seam line, outer peripheral edges of a vehicular interior panel and a vehicular exterior panel that face each other, the side airbag forming three chambers including a lumbar restraining chamber, a shoulder restraining chamber, and a chest restraining chamber inside the side airbag, and an inflator that injects the inflator gas is provided in a vehicular rear portion inside the side airbag, wherein a main portion of the side airbag is formed of at least one of the shoulder and lumbar restraining chambers, wherein the side airbag is attached to the seatback such that a vehicular rear portion of the main portion is inflated inside the seatback, wherein the three chambers are separated from one another by a first baffle and a second baffle, wherein the first baffle is shaped like a band having a width in a vehicular width direction and extends in a vehicular front-rear direction inside the side airbag, and is joined, at a longitudinally rear end of the first baffle, to a rear edge of the side airbag, wherein the second baffle is shaped like a band having a width in the vehicular width direction and extends in a vehicular up-down direction inside the side airbag, and has a baffle overlap area which is set at an intermediate position of the second baffle and to which a longitudinally front end of the first baffle is connected along with the vehicular interior panel and the vehicular exterior panel, and both ends of the second baffle are joined to an outer peripheral edge of the side airbag, and wherein a gap is formed between the longitudinally front end of the first baffle and the second baffle so as to form an internal vent hole.

12. A vehicular side airbag apparatus comprising a side airbag that includes a vehicular interior panel member and a vehicular exterior panel member and that is deployed and inflated from a vehicular rear direction toward a vehicular front direction between an occupant and a vehicular side portion when an inflator gas is fed into the side airbag, the vehicular side airbag apparatus further comprising:

a front up-down partitioning portion formed inside the side airbag so as to extend in a vehicular front-rear direction from a front end toward a rear end of the side airbag to a point at a distance from the rear end of the side airbag;

a rear up-down partitioning portion formed inside the side airbag so as to extend in the vehicular front-rear direction from the rear end toward the front end of the side airbag to a point at a distance from the front end of the side airbag, the rear up-down partitioning portion including an overlap portion partially facing the front up-down partitioning portion in the up-down direction and extending along a portion of the front up-down partitioning portion;

an upper bag area defined in an internal upper portion of the side airbag by the front and rear up-down partitioning portions;

a lower bag area defined in an internal lower portion of the side airbag by the front and rear up-down partitioning portions; and an inflator arranged on a rear side of the side airbag in the vehicular front-rear direction to feed the inflator gas into the upper bag area, and between the overlap portion and the front up-down partitioning portion, a gas passage is formed through which the inflator gas flows from the upper bag area into the lower bag area and which is closed off by at least one of the overlap portion and the front up-down partitioning portion that are flexibly deformed by the inflator gas fed into the lower bag area.

13. The vehicular side airbag apparatus according to claim 12, wherein the front up-down partitioning portion includes an upper extension portion extending continuously from a rear end of the front up-down partitioning portion in the vehicular front-rear direction toward an upper side in a vehicular up-down direction and reaching an upper end of the side airbag, the upper bag area is partitioned into a front upper bag area and a rear upper bag area by the upper extension portion, and a gas introduction path for feeding the inflator gas from the rear upper bag area to the front upper bag area is formed in the upper extension portion.

14. The vehicular side airbag apparatus according to claim 12, wherein the front up-down partitioning portion is formed using a first band-shaped member, widthwise both ends of the first band-shaped member are integrally joined to the vehicular interior panel member and the vehicular exterior panel member, respectively, and a front end of the first band-shaped member is integrally joined to the vehicular interior panel member and the vehicular exterior panel member.

15. The vehicular side airbag apparatus according to claim 14, wherein the rear up-down partitioning portion is formed using a second band-shaped member, widthwise both ends of the second band-shaped member are integrally joined to the vehicular interior panel member and the vehicular exterior panel member, respectively, and a rear end of the second band-shaped member is integrally joined to the vehicular interior panel member and the vehicular exterior panel member.

16. The vehicular side airbag apparatus according to claim 15, wherein the vehicular interior panel member and the vehicular exterior panel member each include an upper panel portion and a lower panel portion, and the upper panel portion and the lower panel portion are joined together by laying a lower portion of the upper panel portion on top of an upper portion of the lower panel portion.

17. The vehicular side airbag apparatus according to claim 16, wherein both side edges of the first band-shaped member are joined to the lower panel portions included in the vehicular interior panel member and the vehicular exterior panel member such that the first band-shaped member bridges upper portions of the lower panel portions, and both side edges of the second band-shaped member are joined to the upper panel portions integrally with the lower panel portions and the first band-shaped member such that the second band-shaped member is sandwiched between the upper portions of the lower panel portions.

18. The vehicular side airbag apparatus according to claim 16, wherein a mountain fold portion is formed in the upper portion of the lower panel portion such that the lower panel portion curves upward, the first band-shaped member is laid on top of the lower panel portion so as to stride over the mountain fold portion, and both side edges of the second band-shaped member are joined to the upper panel portions integrally with the lower panel portion and the first band-shaped member such that the second band-shaped member is held by the mountain fold portion of the lower panel portion in a sandwiched manner.

19. The vehicular side airbag apparatus according to claim 15, wherein the first band-shaped member has a mountain fold portion formed by folding the first band-shaped member downward, both side edges of the second band-shaped member are joined to the vehicular interior panel member and the vehicular exterior panel member integrally with the first band-shaped member such that the second band-shaped member is held by the mountain fold portion of the first band-shaped member in a sandwiched manner.

20. The vehicular side airbag apparatus according to claim 15, wherein when the lower bag area is deployed and inflated and the inflator gas acts on the overlap portion and a gas pressure acts on the overlap portion, a portion of the second band-shaped member is pushed upward toward the first band-shaped member.

21. The vehicular side airbag apparatus according to claim 15, wherein upon activation of the side airbag, the lower bag area is filled with the inflator gas to increase the pressure in the lower bag area and when the pressure in the lower bag area reaches a set pressure the overlap portion is flexibly deformed and brought into contact with the front up-down partitioning portion and the gas passage is closed off, and the inflator gas is fed into the upper bag area to further deform the first band-shaped member so as to push the first band-shaped member down toward the portion of the second band-shaped member located at the overlap portion.

22. The vehicular side airbag apparatus according to claim 12, wherein the inflator gas is injected from the inflator to first inflate the upper bag area and thereafter the lower bag area.

* * * * *